United States Patent
Haapanen

(10) Patent No.: US 8,891,106 B1
(45) Date of Patent: Nov. 18, 2014

(54) ACCESS CONTROL SYSTEM AND METHOD FOR MOBILE PRINTING

(71) Applicant: Tom Haapanen, Heidelberg (CA)

(72) Inventor: Tom Haapanen, Heidelberg (CA)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/924,798

(22) Filed: Jun. 24, 2013

(51) Int. Cl.
*G06K 15/00* (2006.01)
*G06F 3/12* (2006.01)

(52) U.S. Cl.
USPC ........................................ 358/1.14; 358/1.15

(58) Field of Classification Search
USPC .............. 358/1.1, 1.13, 1.14, 1.15, 1.18; 709/203, 223, 226; 715/736; 717/174, 717/177
See application file for complete search history.

(56) References Cited

U.S. PATENT DOCUMENTS

| | | | |
|---|---|---|---|
| 7,031,661 B2* | 4/2006 | Berkema et al. | 455/41.3 |
| 7,818,467 B2* | 10/2010 | Anwer | 710/10 |
| 2012/0113459 A1* | 5/2012 | Williams et al. | 358/1.15 |
| 2012/0265865 A1 | 10/2012 | Tanaka et al. | |
| 2012/0266073 A1 | 10/2012 | Tanaka et al. | |
| 2013/0085968 A1 | 4/2013 | Schultz et al. | |
| 2014/0146832 A1* | 5/2014 | Pohlmann, Frank | 370/420 |

OTHER PUBLICATIONS

U.S. Appl. No. 13/758,082, Kenji Hagiwara et al., filed Feb. 4, 2013.
U.S. Appl. No. 13/758,116, Greg Melendez et al., filed Feb. 4, 2013.
U.S. Appl. No. 13/758,110, Greg Anderson et al., filed Feb. 4, 2013.
U.S. Appl. No. 13/855,083, Tom Haapanen, filed Apr. 2, 2013.
"Airplay and Airprint on Campus Networks", 2012, Aruba Networks, Inc.
"The Enterasys Networks Solution for Apple Bonjour Traffic Management", 2012, Enterasys Networks, Inc.
"One Fabric Connect—Extend the OneFabric architecture to 3$^{rd}$ party applications", 2013, Enterasys Networks, Inc.
Bonjour Overview, Apr. 23, 2013, Apple, Inc.

* cited by examiner

Primary Examiner — Gabriel Garcia
(74) Attorney, Agent, or Firm — Cooper & Dunham LLP

(57) ABSTRACT

A system and method are configured to provide print services for mobile printing to terminals. A subnet proxy discovers printers on one or more subnets of a network and advertises print services.

8 Claims, 28 Drawing Sheets

| Session Control Information |||||| 
|---|---|---|---|---|---|
| User | Username | Device ID | Session | Expired? | Notify |
| Michael Scranton | mscranton | 08:56:4a:6c:9c:2b | 20 minutes | Yes | Yes |
| Nicholas Wright | nwright | 11:68:1c:33:6d:22 | 20 minutes | No | No |
| Connie Edison | cedison | 8a:5e:45:32:4e:6f | 30 minutes | No | No |
| Bob Green | bgreen | 18:5b:02: 31:9c:1b | 20 minutes | No | No |
| Alice Brown | abrown2 | 07:56:34:3e:55:2a | 30 minutes | Yes | Yes |
| James Jones | guest15 | 59:47:4a:3c:9c:2b | 1 hour | Yes | No |

| User Information | | | |
|---|---|---|---|
| User | Role | Accessible Functions | Non-Accessible Functions |
| Michael Scranton | CEO | All | None |
| Nicholas Wright | Company Attorney | Black & White<br>N-up<br>8.5 x 11 Paper<br>A4 Paper<br>Duplex | Color |
| Connie Edison | Chief Engineer | Black & White<br>N-up<br>8.5 x 11 Paper<br>A4 Paper<br>Duplex | Color |
| Bob Green | IT Manager | All | None |
| Rose LeFleur | Secretary | Black & White<br>N-up<br>8.5 x 11 Paper | Color<br>A4 Paper |
| James Jones | Guest | Black & White<br>Duplex | Color<br>A4 Paper<br>1-Sided |

| Virtual Queue ||
| :---: | :---: |
| Users | Print Jobs |
| Michael Scranton | ExecutiveSummary.doc<br>Presentation.ppt |
| Nicholas Wright | BusinessContracts.doc<br>UniformCommercialCode.pdf |
| Connie Edison | IEEEPaper.pdf |
| Bob Green | CCNAbooklet.pdf |
| Alice Brown | DeviceReport.xls |
| James Jones | Sales.ppt |

Fig. 24

Here is a list of your print jobs:

| Print Job Name | No. of Pages | Status | Print | Remove | Properties |
|---|---|---|---|---|---|
| Print Job 1 | 24 | Printing | ▓ | ☐ | ▓ |
| Print Job 2 | 145 | Ready | ☐ | ☐ | ☐ |
| Print Job 3 | 4 | Ready | ☐ | ☐ | ☐ |
| Print Job 4 | 2 | Ready | ☐ | ☐ | ☐ |
| Print Job 5 | 1268 | Uploading | ▓ | ☐ | ▓ |
| . | . | . | . | . | . |
| . | . | . | . | . | . |
| . | . | . | . | . | . |

[ Print ]  [ Remove ]  [ Change Properties ]

Fig. 26

ACCESS CONTROL SYSTEM AND METHOD FOR MOBILE PRINTING

TECHNICAL FIELD

This disclosure relates to tools (such as systems, apparatuses, methodologies, computer program products, etc.) for providing print services, and more particularly, for providing print services to mobile terminals over a network that includes one or more subnets.

BACKGROUND

In the current information age, information technology (IT) tools play a significant role in our daily activities, and there are often discussions of the desirableness of a paperless society. However, notwithstanding such discussions, there remains a need by users of computers and other information terminals (such as smartphones, PDAs, other information appliances, etc.) for printing functionality. Therefore, devices having printing or plotting functionality, such as printers, copiers, multi-function devices, etc., continue to play a significant role at home, at work and even elsewhere.

In many cases, a mobile terminal is employed to access information, while the user is on-the-go, in an IT environment with which the user may not be familiar and/or in which the user is unaware of the IT resources available to the user in that environment. Further, the mobile terminal may not have appropriate driver software needed to submit a job to, for example, a printer that the user has found nearby (the user).

There remains a need for an improved approach that allows users to more conveniently print from a mobile device.

SUMMARY

Various tools (for example, a system, an apparatus, application software, etc.) can be configured to provide print services over a network that includes one or more subnets, in the manner described in this disclosure.

In an aspect of this disclosure, a session control apparatus is configured to control access of a requesting terminal to a resource, application, service, etc., based on user credentials supplied from the terminal. The user credentials may be supplied through a mobile application (app) on a user terminal, through a browser application, or otherwise. When such user credentials are authenticated, a session commences and is registered in association with the user credentials. Such session may terminate upon request from the terminal, or after a predetermined amount of inactivity, or upon occurrence of another event, etc.

In another aspect, a subnet proxy (which may be a device, software or combination of the two) is configured to discover printing devices located on one or more subnets of a network, and advertise print services. When the subnet proxy receives a print service inquiry from a terminal, the subnet proxy checks whether the terminal has an active session registered with the session control apparatus, and if such active session is present, determines and advertises printers that are available to the terminal.

In another aspect of this disclosure, in a case that the subnet proxy apparatus determines that there is not an active session registered in association with the terminal, the subnet proxy apparatus does not advertise any printers to the terminal. On the other hand, in a case that the subnet proxy apparatus determines that a previous session was registered in association with the terminal and is no longer active, the subnet proxy apparatus can transmit an electronic notice to a registered address associated with the user credentials that was registered in connection with the previous session.

In another aspect of this disclosure, a device management apparatus may be available in the system to manage devices on one or more particular subnets, as well as other devices connected to the network, and the subnet proxy may communicate with the device management apparatus, in order to obtain the benefit of the device data maintained by the device management apparatus. For example, the device management apparatus can determine based on the user credentials one or more printers, amongst the devices managed by the device management apparatus, that the user is authorized to use, and communicates a list, and/or other information (e.g., indicating device capabilities), of printers on the subnets, to the subnet proxy. On the other hand, the subnet proxy may determine the printing services that are available to the terminal by reference to such information from the device management apparatus and/or other approaches for discovery of printers (such as broadcasting a query over the subnets, referring to a directory service, etc.).

In another aspect of this disclosure, a job processing apparatus may be available in the system to process print jobs submitted to a generic job destination which is not associated with any particular printing device, and store the print jobs in association with user credentials in a job repository associated with the generic job destination. Upon the user selecting or specifying a destination printer, the subnet proxy apparatus causes the print job stored in association with the user credentials in the job repository to be transmitted to said selected or specified printer.

BRIEF DESCRIPTION OF THE DRAWINGS

The aforementioned and other aspects, features and advantages can be more readily understood from the following detailed description with reference to the accompanying drawings wherein:

FIG. 13 shows an example of session control information;

FIG. 14 shows an example of user information maintained by the session control apparatus shown in FIG. 1A and by the session control apparatus shown in FIG. 1B;

FIG. 24 shows an example of data maintained on a virtual queue of print jobs;

FIG. 26 shows an example of user interface display screens displayed on a terminal showing a user's print jobs;

DETAILED DESCRIPTION

Figure 1A:
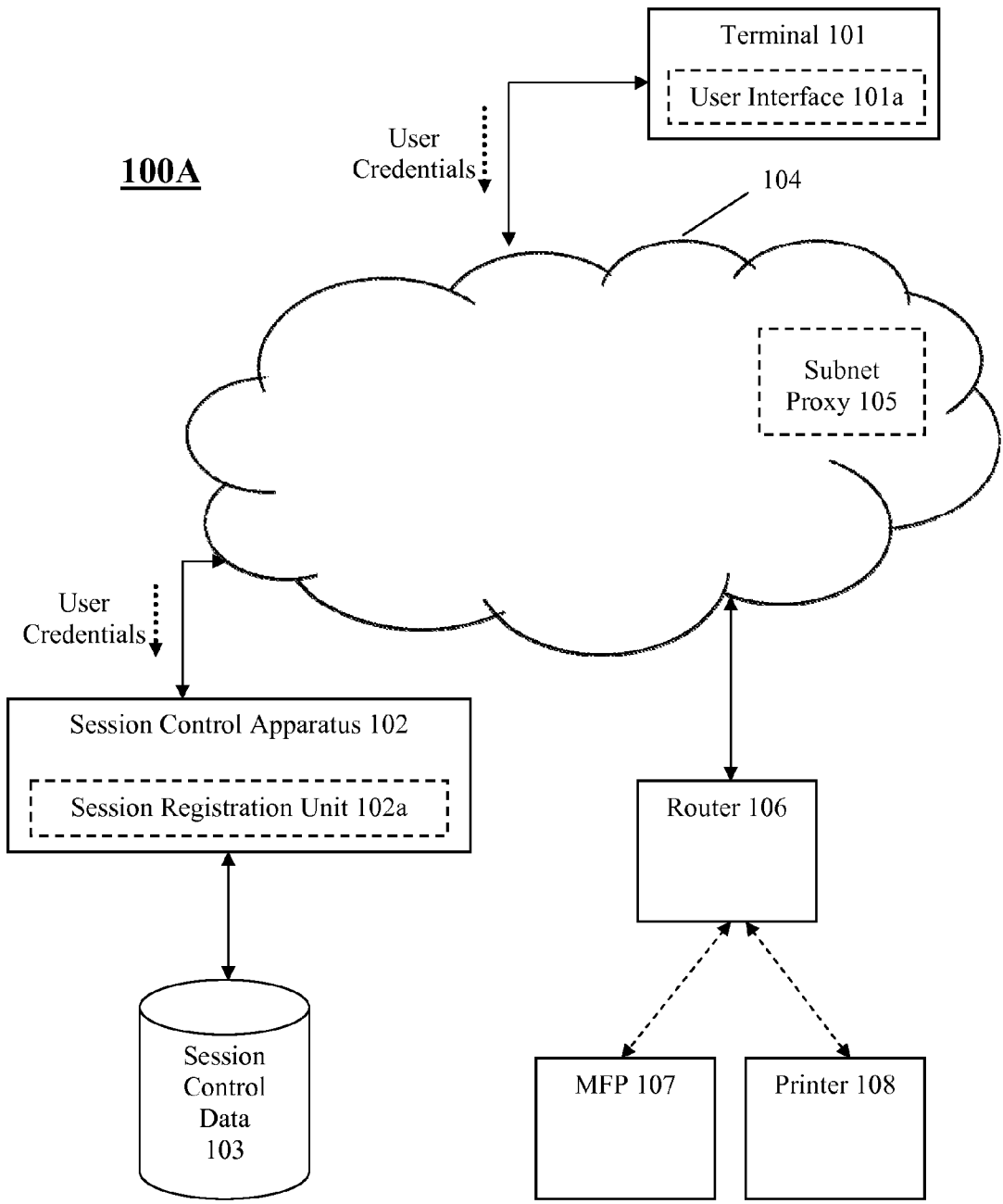
FIG. 1A shows a block diagram of an access control system for providing print services, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention. Referring now to the drawings, wherein like reference numerals designate identical or corresponding parts throughout the several views, there are described tools (systems, apparatuses, methodologies, computer program products, etc.) for providing print services over a network to a user.

FIG. 1A shows schematically an access control system 100A that includes, all of which are interconnected by network 104, a terminal 101, a session control apparatus 102, a subnet proxy 105, and a router 106. Further, a multi-functional printer (MFP) 107 and a printer 108 are connected to the router 106.

The terms "printer" and "printer device" are used hereinafter generically to include any output device having a printing or plotting functionality, and include multi-function devices having a copy and/or scanning functionality in addition to the printing or plotting functionality.

The network 104 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 103. In addition, the network 103 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 5:
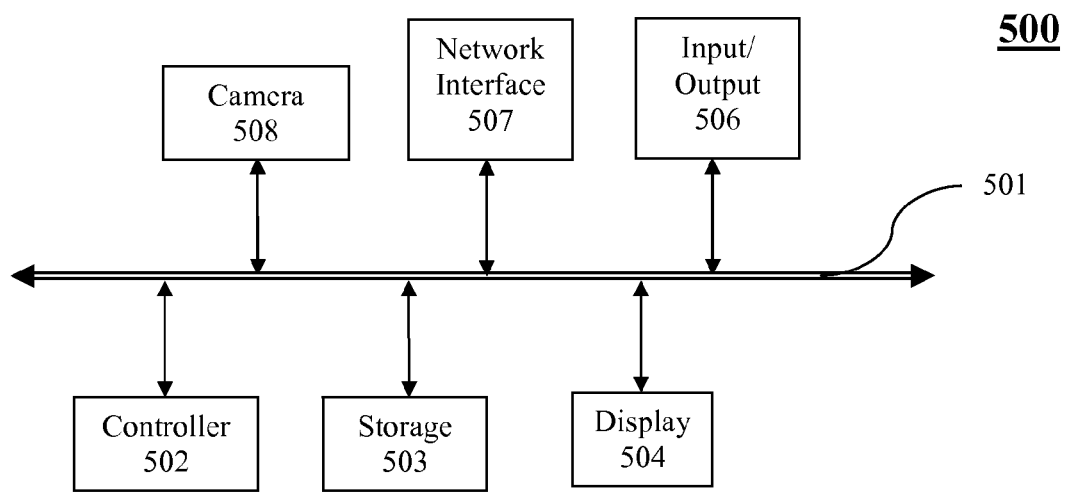
FIG. 5 shows a block diagram of an exemplary configuration of a terminal.

The terminal 101 can be any information terminal, including but not limited to a notebook computer, a tablet computer, a mobile phone or handset, a PDA (personal digital assistant), another computing device, etc., that can, and is configured to, communicate with other devices through the network 103. The terminal 101 may be configured as shown in FIG. 5, which is discussed infra.

In addition, the terminal 101 includes user interface 101a which allows the user to access various content and software applications. For example, the user interface 101a provides means for a user to access various mobile applications (commonly known as "apps"), a browser application through which the user can access the web, etc. For example, the user may operate the user interface 101 on the terminal 101 to request access to an access control application from the session control apparatus 102. Such access typically requires the terminal to transmit user credentials, such as entered through the user interface 101a, to the session control apparatus 102. The user interface may include a graphical user interface through which the user enters username, password, etc. However, user credentials may alternatively or additionally include other information. For example, the user interface may include, or may be integrated with, components for speech processing, voice recognition, fingerprint scanning, facial recognition, retina scanning, other forms of biometric authentication, etc. Such components, like the user interface 101a, can include a combination of software and hardware components. Since such provisions are well known in the art, and do not form an inventive aspect of this disclosure, details thereof are not provided herein in order to avoid obscuring the inventive aspects of this disclosure.

The session control apparatus 102 maintains session control data 103 and may operate additionally as, or may be integrated with, an access control apparatus (e.g., 102C in FIG. 1C) that controls access to an access control application. The term "access control application" as used herein refers to any software application that requires entry and authentication of user credentials before access to the functionalities of the application is granted.

Figure 1B:
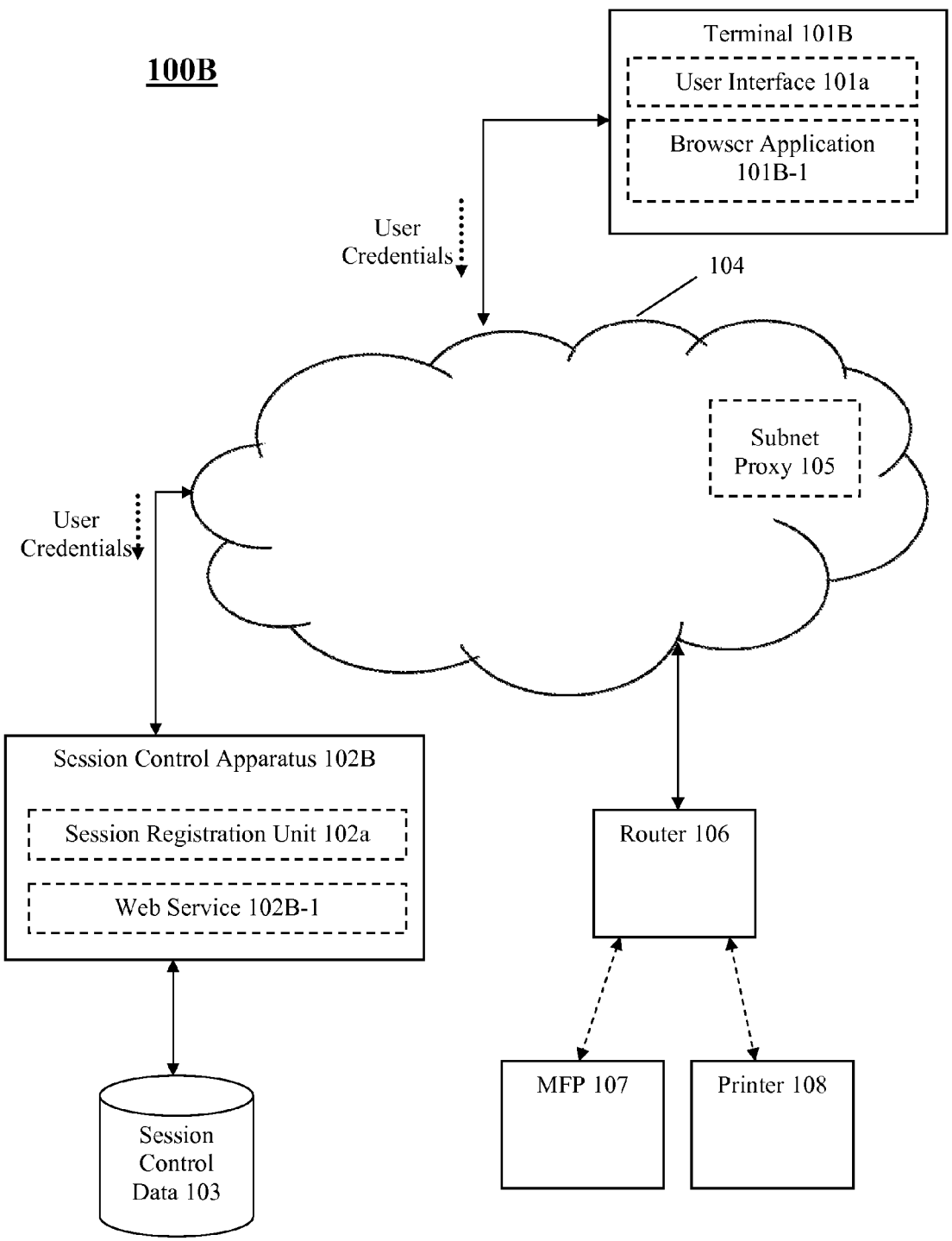
FIG. 1B shows a block diagram of an access control system for providing print services, according to another exemplary embodiment.
Figure 6:
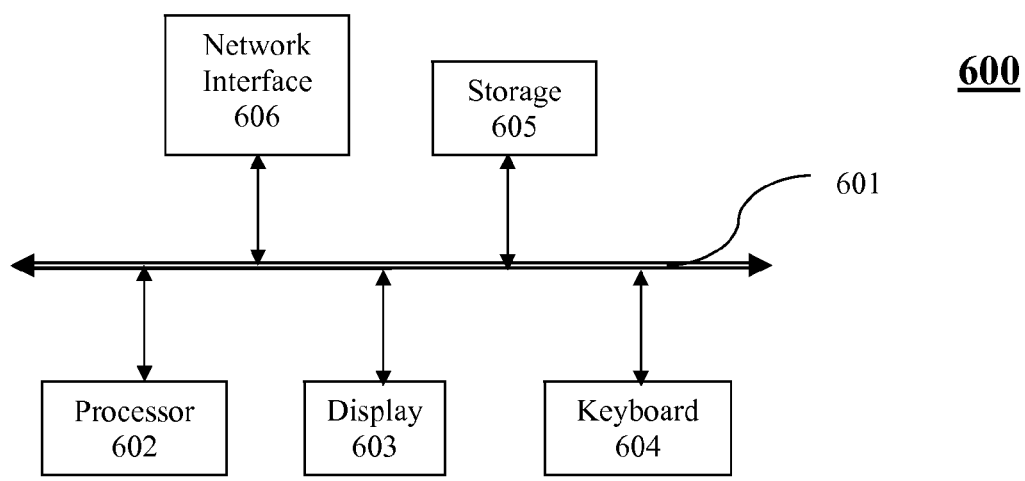
FIG. 6 shows a block diagram of an exemplary configuration of a computing device.

The session control apparatus 102 may include an application server for servicing the access control application on the terminal 101. Additionally or alternatively, the session control apparatus can include a web server to allow a user to sign-on to a session through a browser application on the terminal 101 (FIG. 1B). The session control apparatus 102 may be configured as shown in FIG. 6, which is discussed infra.

In any event, the session control apparatus 102 includes a session registration unit (or part) 102a. The session control apparatus 102 may be a computer configured by a program of instructions to include the session registration unit 102a which receives authenticated user credentials and causes authentication of a user.

For example, when a user logs in on the terminal 101 to the access control application, the entered user credentials are authenticated and passed to the session registration unit 102a, and the session registration unit 102a registers a session that is associated with the user credentials in the session control database 103. Further the session registration unit 102a may send notifications to the user of the terminal 101 when a session has expired.

The session control data 103 may be captured in an external database or may be maintained in storage of the session control apparatus 102. In addition to the user credentials, the session control data 103 can further include name of the user, session time, identifier of the terminal 101, subnet that terminal 101 is currently on, access rights, etc.

The subnet proxy 105 can be a network appliance or a software implementation on any network-connected device connected to the network 105 (such as a router). The subnet proxy 105 can discover printing devices located on one or more subnets of the network 104 (such as by broadcasting a query over the subnets, referring to a directory service, etc.), and advertise print services. For example, the subnets may employ Bonjour protocol which is an implementation of Zero configuration networking using multicast Domain Name System (mDNS) service records. Such configuration allows a printer to be connected to the subnet without the need to assign it a specific IP address or manually enter that address into each computer, and the printer can be discovered by appropriate query under the protocol and the printer's network address can be automatically determined.

When the subnet proxy 105 receives a print service inquiry from the terminal 101, the subnet proxy checks whether the terminal 101 has an active session registered with the session control apparatus 102, and if such active session is present, determines and advertises printers that are available to the terminal. On the other hand, if the subnet proxy 102 determines that there is not an active session registered in association with the terminal 101, the subnet proxy 102 does not advertise any printers to the terminal 101. In a case that the subnet proxy 102 determines that a previous session was registered in association with the terminal 101 and is no longer active, the subnet proxy 102 can transmit an electronic notice to a registered address associated with the user credentials that was registered in connection with the previous session.

It should appreciated that although only one subnet proxy is shown in FIG. 1A, the system 100 can include plural subnets and therefore plural subnet proxies can be disposed in the system, and they can have similar or different configurations.

The subnet proxy 105 need not be, but can be, connected to the same subnet to which the terminal 101 is connected. For example, the subnet proxy may employ Proxy ARP (Address Resolution Protocol) which is a technique by which an ARP Proxy device on a particular network (e.g., network 104) answers ARP queries for a network address that is not on that network. The ARP Proxy is aware of the location of the traffic's destination, and offers its own MAC (Media Access Control) address in reply. In such circumstance as an ARP Proxy for another host, traffic is directed to the ARP Proxy, and such captured traffic is then routed by the ARP Proxy appropriately to the intended destination.

The router 106 can be any device that connects one network to another network, such as to connect wireless devices to a wired network. Further, the router 106 may be a wireless access point (or may be an Ethernet switch). Thus, the router does not need to be limited to any particular physical device. For example, the router 106 may include a smart phone or a tablet computer having a 3G (or more recent generation) cellular data connection and configured as a hotspot. A personal computer, such as a laptop, with a wireless adapter or wireless network card may also be configured as a router. While this example simply refers to a single router 106 in the interest of brevity, it should be appreciated that the network environment can have an arbitrary number of router devices.

Figure 8:
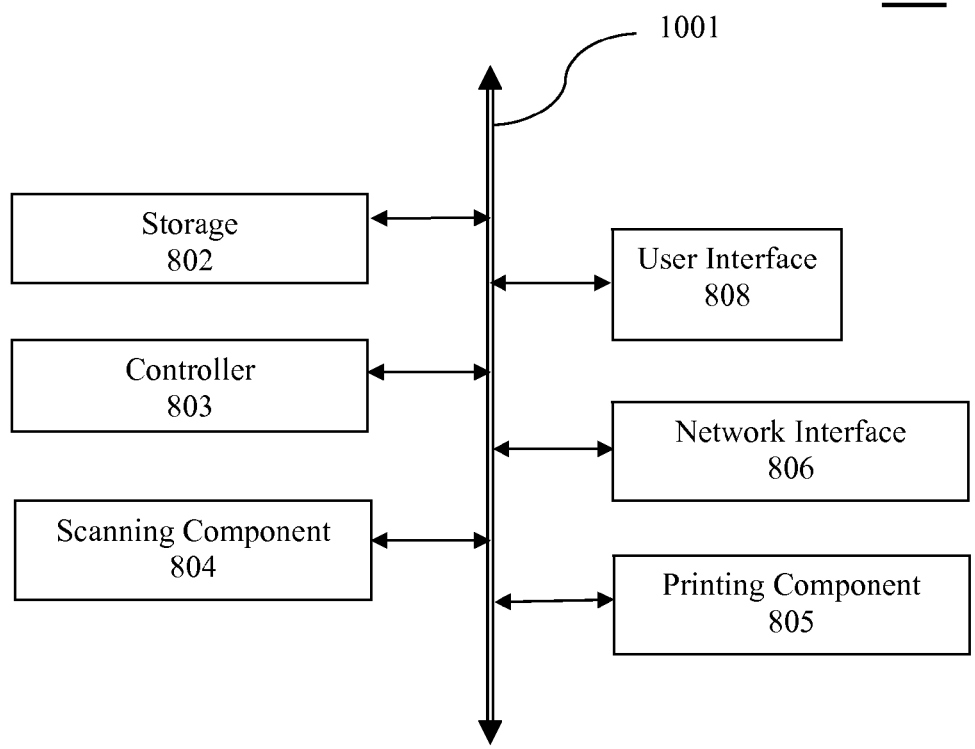
FIG. 8 shows a block diagram of an exemplary configuration of a multi-function device.

The MFP 107 can be, for example a printer/scanner, printer/scanner/fax, etc. While this example of this disclosure simply refers to a single MFP 107 and a single printer 108 in the interest of brevity, it should be appreciated that the network environment can have an arbitrary number of printer and MFP devices. The MFP 107 may be configured as shown in FIG. 8, which is discussed infra.

FIG. 1B shows schematically an access control system 100B for providing print services over a network, according to another exemplary embodiment. The system 100B is similar to the system 100A except that terminal 101B additionally includes browser application 101B-1, and session control apparatus 102B is configured to additionally provided a web server 102B-1.

The browser application 101B-1 allows the user to access the web. For example, the user may enter an URL (Uniform Resource Locator) to access a corresponding web page or the user may login to an account using the browser application 101B-1. Examples of browser applications include, but are not limited to, Google Chrome®, Safari®, Internet Explorer Mobile®, Android Browser®, etc.

The web server 102B-1 can be hosted by the session control apparatus 102B to provide various services (e.g., web page, download, upload or manage files or documents, access other content, etc.) through the web to user. For example a user operating the browser 101B-1 can access the web services 102B-1.

Otherwise, operations of the elements of the system 100B are similar to those discussed in connection with the system 100A of FIG. 1A.

Figure 1C:
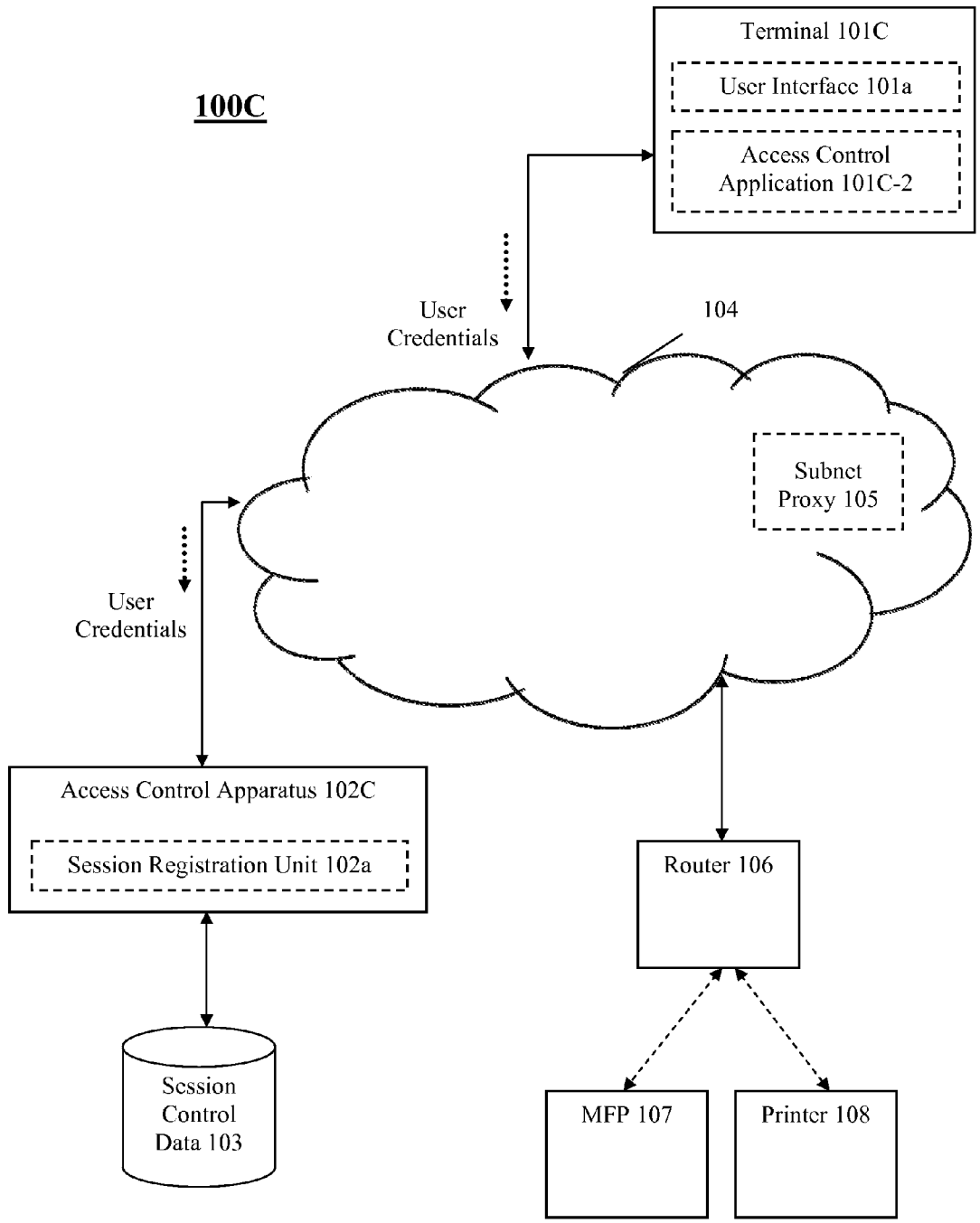
FIG. 1C shows a block diagram of an access control system for providing print services, according to another exemplary embodiment.

FIG. 1C shows schematically an access control system 100C for providing print services over a network, according to another exemplary embodiment. The system 100C is similar to the system 100A except that terminal 101C additionally includes an access control application 101C-2, and the access control apparatus 102C includes, in addition to the functionalities of the session control apparatus 102 of system 100A, access control functionalities. That is, in order for the terminal 101C to access to the functionalities of the access control application, the terminal 101C must transmit user credentials, such as entered through the access control application 102C-2 or the user interface 101a, to the access control apparatus 102C. As discussed supra, access to the functionalities of the access control application requires entry and authentication of user credentials.

Otherwise, operations of the elements of the system 100C are similar to those discussed in connection with the system 100A of FIG. 1A.

In addition, the access control application 102C may also communicate with the subnet proxy 105 and can submit print jobs from the terminal 101C.

Figure 2:
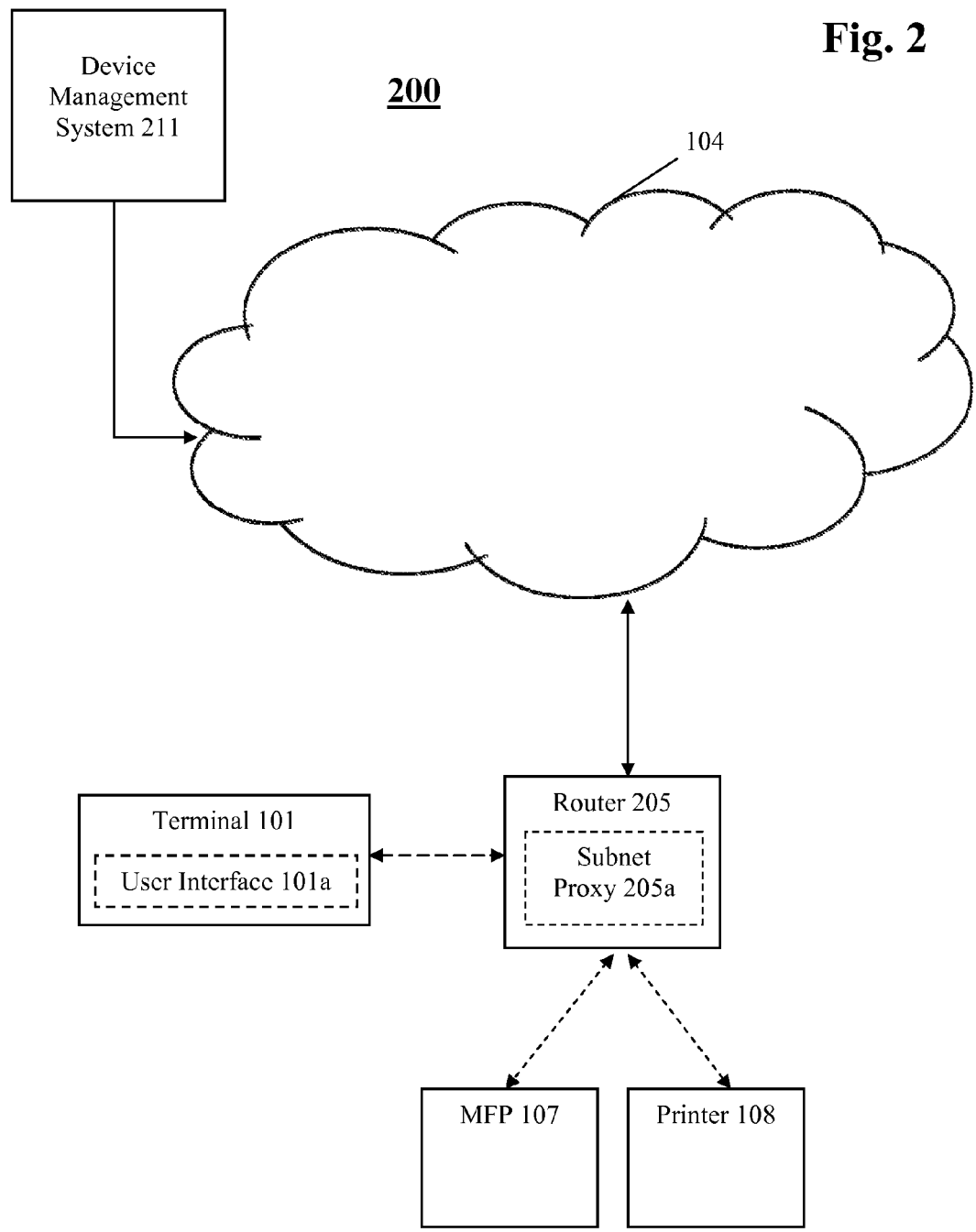
FIG. 2 shows a block diagram of an access control system for providing print services, according to another exemplary embodiment.

FIG. 2 shows schematically an access control system 200 for providing print services over a network, according to another exemplary embodiment.

The system 200 is similar to the system 100A except that the system 200 additionally includes a device management apparatus 211, the terminal 101 has been relocated to be connected to router 205, and the router 205 includes a subnet proxy 205a.

The device management unit 211 manages and collects data from a plurality of devices through the network 104. For example, the device management unit 211 may collect information on the MFP 107 and the printer 108. This information may include a name/identifier, functions (black & white, duplex, fax, scanning, N-up, etc.), physical location, network address (IP address, MAC address, etc.), output technology (laser, inkjet solid ink, thermal, other technology, etc.) supply level (consumable types such as paper and toner>empty/low/ok, etc.), pages per job (e.g., 1, 2, 6-10, etc.), color technology (professional color, convenience color, etc), properties (manufacturer, model, serial number, etc), etc. In addition the device management unit 211 may also store user information. The user information may include name of users, username, password, devices that the user has access to, functions that the user has access to, user role, user terminal, etc. In addition, the device management unit 211 may send this information to subnet proxy 105 when requested.

The subnet proxy 205a communicates with the device management apparatus 200, in order to obtain the benefit of the device data maintained by the device management apparatus 200. For example, the subnet proxy 205a communicates a request along with user credentials received from the terminal 101 to the device management apparatus 200, and the device management apparatus determines, based on the user credentials, one or more printers that the user is authorized to use, and communicates a list, and/or other information (e.g., indicating device capabilities), of printers on the subnets, to the subnet proxy.

Otherwise, operations of the elements of the system 200 are similar to those discussed in connection with the corresponding elements of the system 100A of FIG. 1A.

Figure 3A:
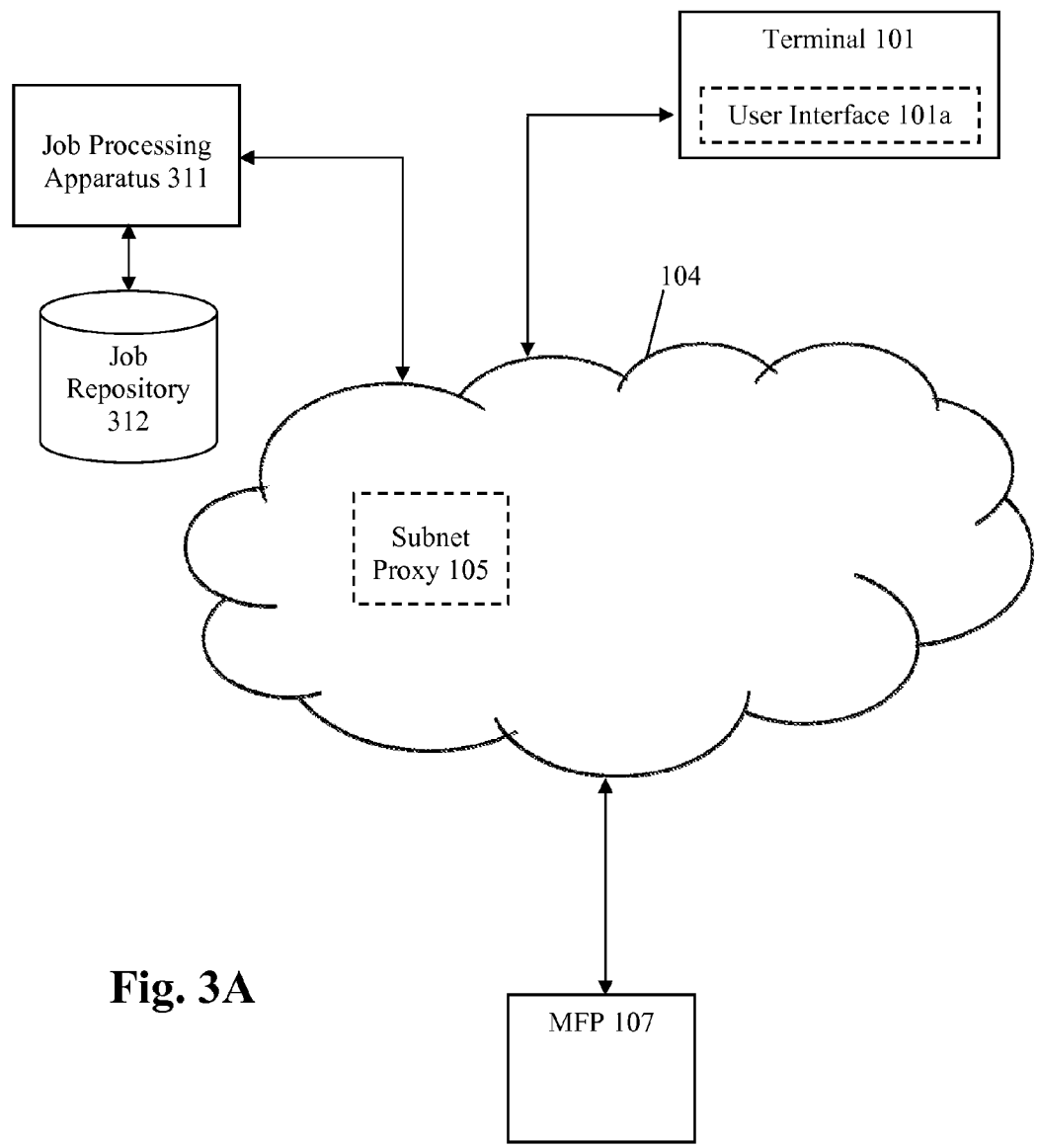
FIG. 3A shows a block diagram of an access control system for providing print services, according to another exemplary embodiment.

FIG. 3A shows schematically an access control system 300A for providing print services over a network, according to another exemplary embodiment. The system 300A is similar to the system 100A except that the system 300A additionally includes a job processing apparatus 311 and a job repository 312.

The job processing apparatus 311 is connected to network 104, and may include, for example, an application server to service job requests submitted through a mobile application, and/or a web server to provide web service (e.g., 311B-1 in FIG. 3B) requested via a browser application on the terminal 101. For example, the job processing apparatus may store print jobs, submitted by users via the mobile application or browser application, onto a virtual queue (e.g., shown notionally in FIG. 24, and stored in the job repository 312 in FIG. 3A which may be an external storage device or storage internal to the job processing apparatus 311). The print job is submitted by the user to a generic job destination (which is not associated with any particular printing device), under circumstances that the user does not yet know which printer will generate the print output. The job processing apparatus 311 registers the print jobs in association with user credentials in the job repository 312.

When the user is ready to print out the print job, a print service query is transmitted from the terminal 101 to the subnet proxy 105, and the subnet proxy apparatus causes the print job stored in association with the user credentials in the job repository to be transmitted to a selected or specified printer.

Otherwise, operations of the elements of the system 300A are similar to those discussed in connection with the corresponding elements of the system 100A of FIG. 1A.

Figure 3B:
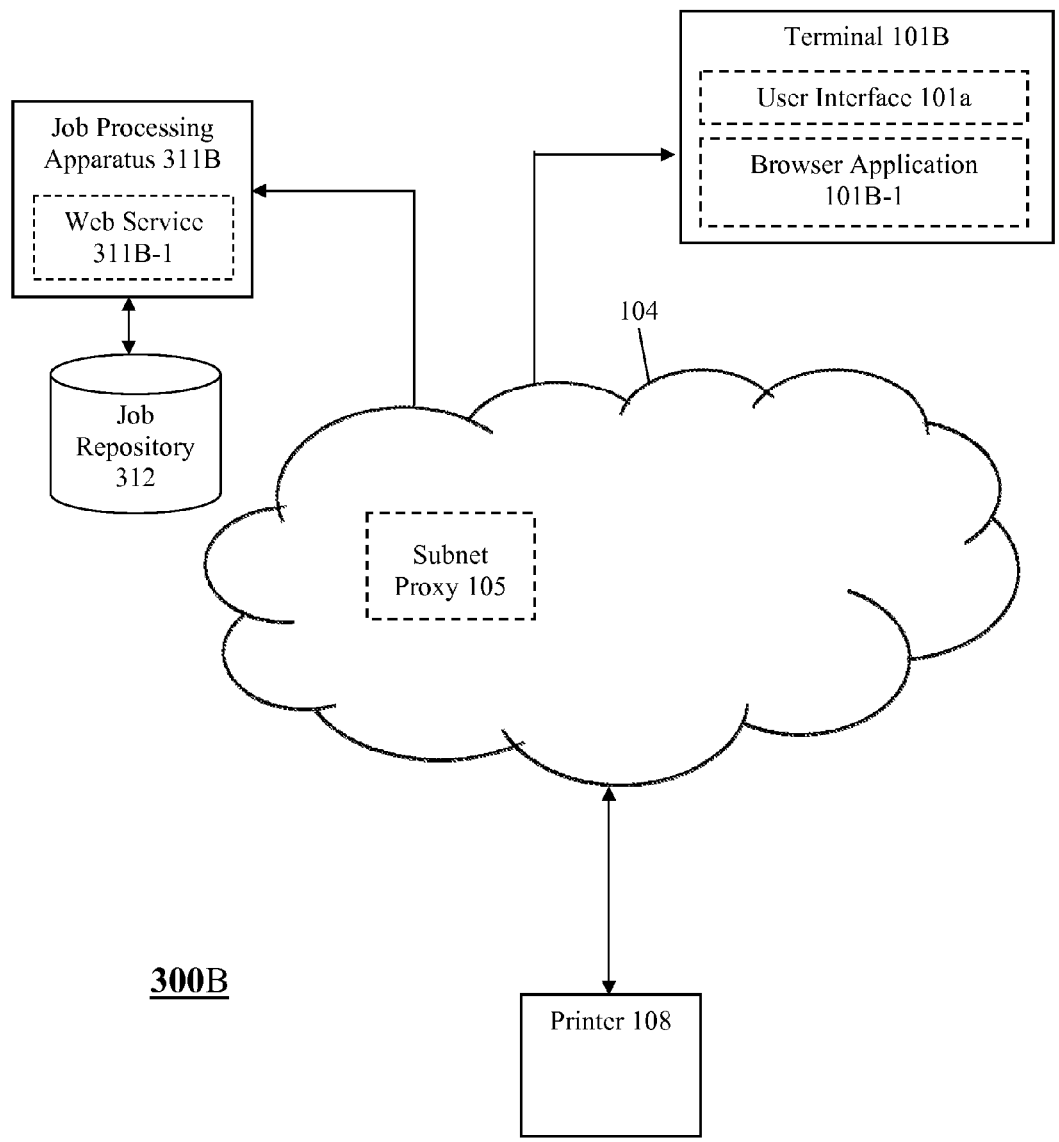
FIG. 3B shows a block diagram of an access control system for providing print services, according to another exemplary embodiment.

Access control system 300B shown in FIG. 3B is similar to the access control system 300A of FIG. 3A, except that in the system 300B, the job processing apparatus 311B includes a web server 311B-1, and the terminal 101B includes a browser application 101B-1.

Otherwise, operations of the elements of the system 300B are similar to those discussed in connection with the corresponding elements of the system 300A of FIG. 3A.

Figure 4:
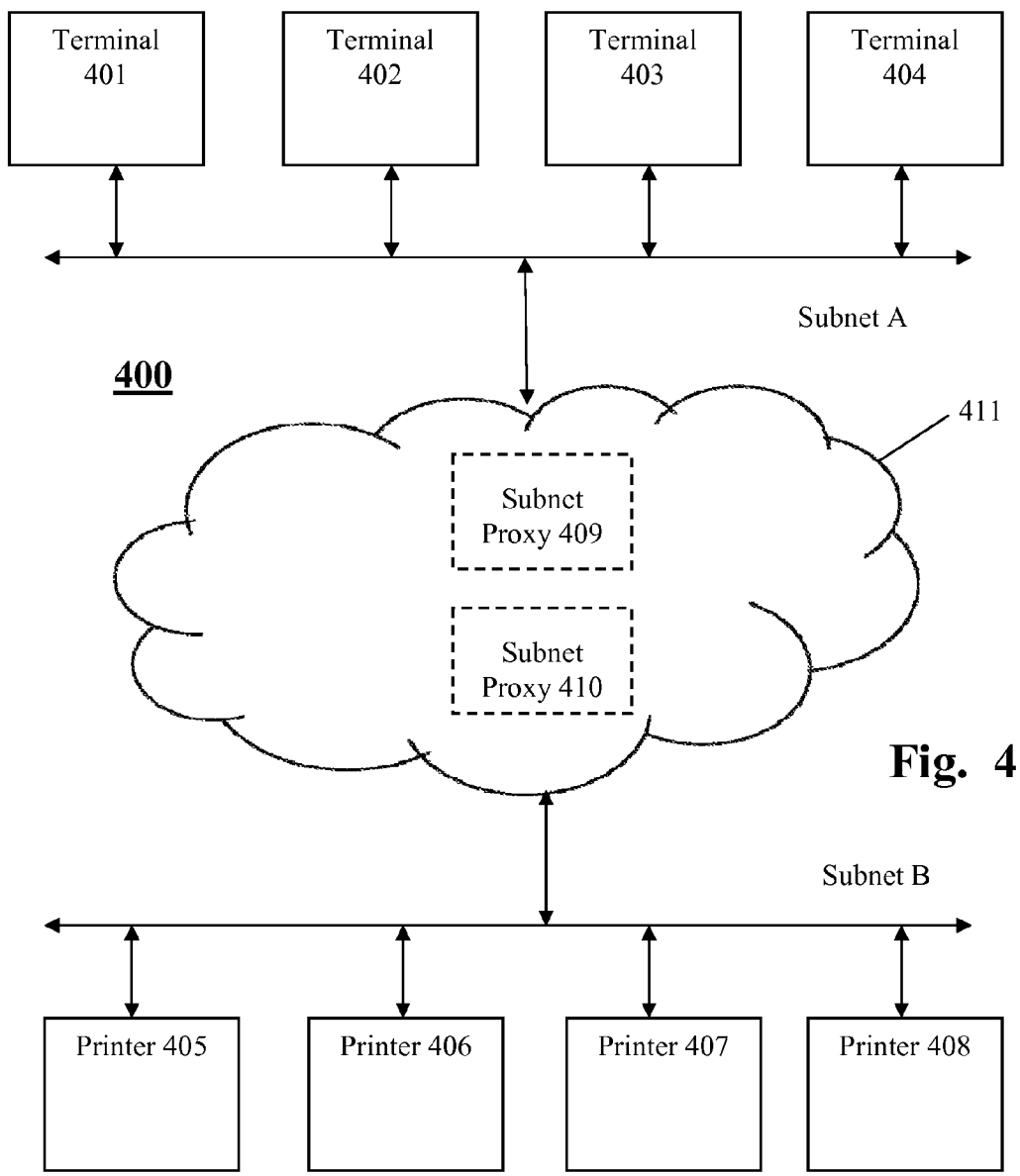
FIG. 4 shows a block diagram of an access control system for providing print services, according to another exemplary embodiment.

FIG. 4 shows schematically an access control system 400 for providing print services over a network, according to another exemplary embodiment. The system 400 comprises terminals 401-404, printers 405-408, subnet proxies 409 and 410, and a network 411. As illustrated in FIG. 4, each of the terminals 401-404 is connected to a subnet A and each of the printers 405-408 is connected to a subnet B.

Each of the terminals 401-404 is configured in a manner similar to the terminal 101. Each of the subnet proxies 409 and 410 is configured in a manner similar to the subnet proxy 105.

Otherwise, operation of the system 400 is similar to the system 100A of FIG. 1A.

An example of a configuration of a terminal that may be employed for the terminal 101 is shown schematically in FIG. 5. In FIG. 5, a terminal device 500 includes a controller (or central processing unit) 502 that communicates with a number of other components, including storage 503, display 504, other input/output (such as mouse, touchpad, stylus, keyboard/keypad, microphone and/or speaker with voice/speech interface and/or recognition software, etc.) 506, network interface 507 and a camera 508, by way of an internal bus 501.

The storage 503 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 507 provides a connection (for example, by way of an Ethernet connection or other network connection which supports any desired network protocol such as, but not limited to TCP/IP, IPX, IPX/SPX, or NetBEUI) to a network (e.g. network 104 of FIG. 1A). The network interface is configured to communicate with any particular device amongst plural heterogeneous devices that may be included in a system in a communication format native to the particular device. The network interface may determine an appropriate communication format native to the particular device by any of various known approaches. For example, the network interface may refer to a database or table, maintained internally or by an outside source, to determine an appropriate communication format native to the device. As another example, the network interface may access an Application Program Interface (API) of the particular device, in order to determine an appropriate communication format native to the device.

The camera 508 is, for example, a digital camera including a series of lenses, an image sensor for converting an optical image into an electrical signal, an image processor for processing the electrical signal into a color-corrected image in a standard image file format, and a storage medium for storing the processed images.

The series of lenses focus light onto the sensor [e.g. a semiconductor device such as a charge-coupled device (CCD) image sensor or a complementary metal-oxide-semiconductor (CMOS) active pixel sensor] to generate an electrical signal corresponding to an image of a scene. The image processor then breaks down the electronic information into digital data, creating an image in a digital format. The created image is stored in the storage medium (e.g. a hard disk or a portable memory card).

The camera 508 may also include a variety of other functionalities such as optical or digital zooming, auto-focusing and HDR (High Dynamic Range) imaging.

The camera 508 may also be used to scan a barcode. As used herein, the term 'barcode' refers to an optical machine-readable representation of data. The data encoded in the barcode is referred to in this disclosure as 'barcode data'. For example, a common type of barcode includes a linear barcode, also referred to as a one-dimensional barcode, wherein such a barcode represents information by varying the width, height and/or spacing of a plurality of parallel lines. Another common type of barcode includes matrix barcode, also referred to as a two-dimensional barcode, wherein such a barcode represents information using rectangles, dots, hexagons and other geometric patterns in 2 dimensions.

Barcodes are often attached to the exterior and/or packaging of various products and items in order to represent information pertaining to that product or item. The information represented by a barcode may include, for example, the manufacturer of the barcode, the type of the product, the model of the product, the identity of the product, the serial number of the product, etc. The barcodes may be scanned and read by special optical scanners called barcode readers, although scanners, cameras and interpretive software are available on devices including desktop printers and smart phones. The technology relating to barcodes and the different types of barcodes are well understood by those skilled in the art, and will not be discussed in further detail herein in order to avoid occluding inventive aspects of this disclosure.

Additional aspects or components of the terminal device 700 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 6 shows an exemplary constitution of a computer 600 that can be configured (for example, through software) to operate (at least in part) as the session control apparatus 102 of FIG. 1A, the access control apparatus 102C of FIG. 1C, or the job processing apparatus 311 of FIG. 3A. As shown in FIG. 6, the management unit 600 includes a controller (or central processing unit) 602 that communicates with a number of other components, including display 803, keyboard 604, memory or storage part 605 and network interface 606, by way of a system bus 601. The computing device 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 800 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 7:
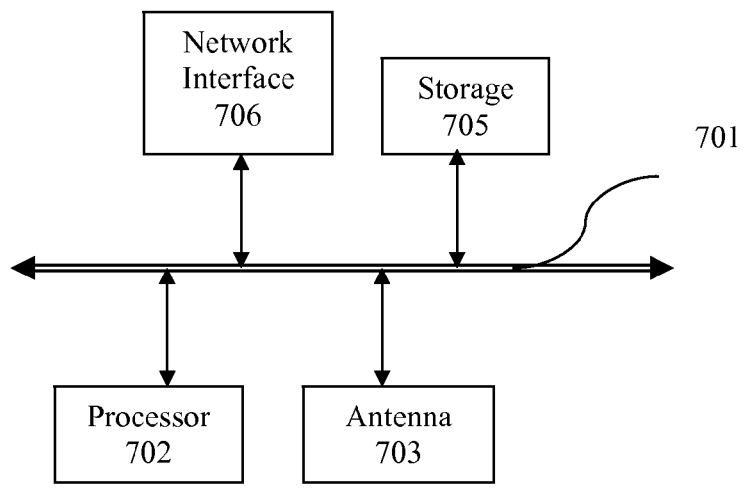
FIG. 7 shows a block diagram of an exemplary configuration of a router.

An example of a configuration of a router 700 is shown schematically in FIG. 7. In FIG. 7, router 700 includes a processor (or central processing unit) 702 that communicates with a number of other components, including antenna 703, storage 704 and network interface 705, by way of an internal bus 701.

The antenna 703 is utilized by the router 700 to transmit and receive signals. The signals may be in the form of data transmitted by one wireless device to another. The antenna 703 may externally protrude from the router 700 or be internal to the router 700.

The storage 704 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 705 provides a connection (for example, by way of an Ethernet connection or other network connection which supports any desired network protocol such as, but not limited to TCP/IP, IPX, IPX/SPX, or Net-BEUI) to a network (e.g. network 104 of FIG. 1A).

Additional aspects or components of the router 700 are conventional (unless otherwise discussed herein), and in the interest of clarity and brevity are not discussed in detail herein.

FIG. 8 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 800 shown in FIG. 8 includes a controller 803, and various elements connected to the controller 803 by an internal bus 801. The controller 803 controls and monitors operations of the MFP 800. The elements connected to the controller 803 include storage 802 (for example, random access memory, read-only memory, hard disk drive, portable storage media drive such as for optical discs, magnetic discs, magneto optical discs, etc., semiconductor memory cards, combinations of storage media, etc.), scanning 804, printing 805, a network interface (I/F) 806 and a user interface 807.

Storage 802 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 802 and executed by the controller 803 to carry out the instructions. Such instructions can include instructions for performing specified functions (such as printing, scanning, faxing, copying, e-mailing, etc.) of the MFP 800, to enable the MFP 800 to interact with a terminal, as well as perhaps other external devices, through the network interface 806, and interactions with users through the user interface 807.

The network interface 806 is utilized by the MFP 800 to communicate with other network-connected devices such as a terminal, a subnet proxy, or a job processing apparatus (e.g. a subnet proxy 104 of FIG. 1A and job processing apparatus 311 of FIG. 3A) and receive data requests, print jobs, user interfaces, and etc.

The user interface 808 includes one or more electronic visual displays that display, under control of controller 803, information allowing the user of the MFP 800 to interact with the MFP 800. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 800, so as to allow the operator to interact conveniently with services provided on the MFP 800, or with the MFP 800 serving as terminal for accessing electronic data or other content through the network. User interfaces or other contents received through the network via the network interface 806 can be displayed on the display screen.

The electronic visual display does not need to be integral with, or embedded in, a housing of the MFP 800, but may simply be coupled to the MFP 800 by either a wire or a wireless connection. The user interface 807 may include keys and/or buttons (such as graphical keys or buttons, or other graphical elements, of a GUI on a touchscreen display) for inputting information or requesting various operations. Alternatively, the user interface 808 and the electronic visual display may be operated by a keyboard, a mouse, a remote control, voice recognition, or eye-movement tracking, or a combination thereof.

Scanning 804, printing 805, and network interface 806 are otherwise conventional, and therefore, a detailed description of such conventional aspects is omitted in the interest of clarity and brevity.

The MFP 800 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 9:
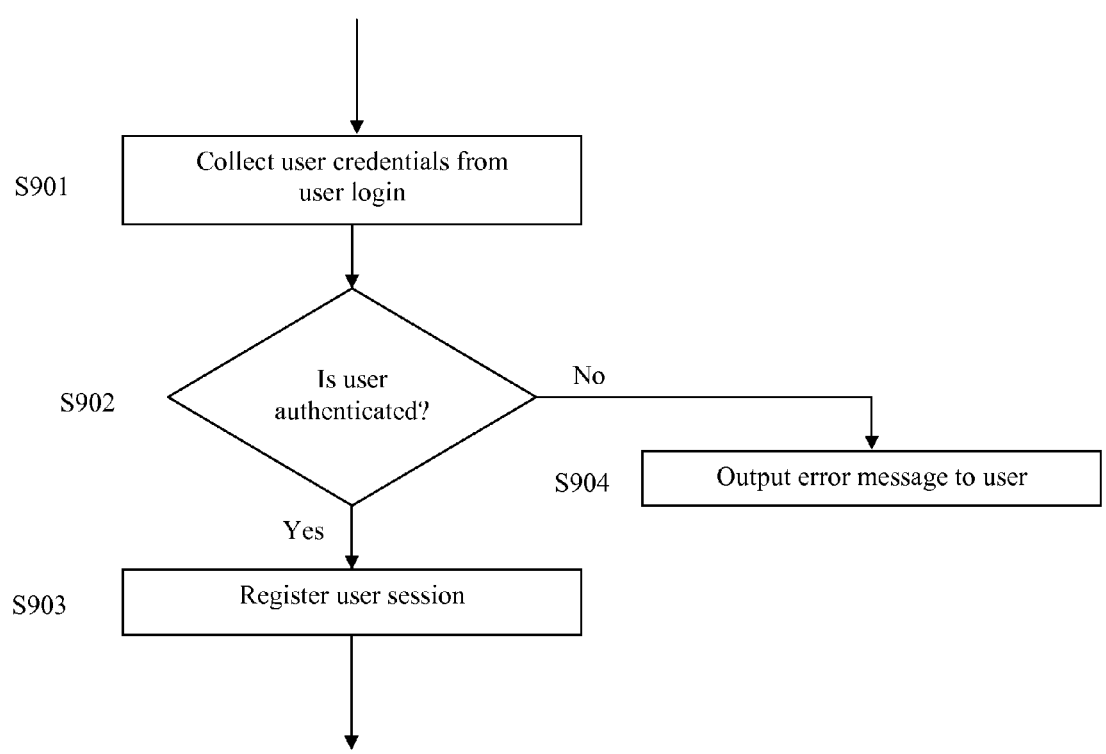
FIG. 9 shows a flow chart of a method performed by the session control apparatus shown in FIG. 1A and the session control apparatus shown in FIG. 1B.

Turning now to FIG. 9 there is shown a flowchart of a process performed by a session control apparatus, such as illustrated in FIG. 1A, according to an exemplary embodiment.

Figure 15:
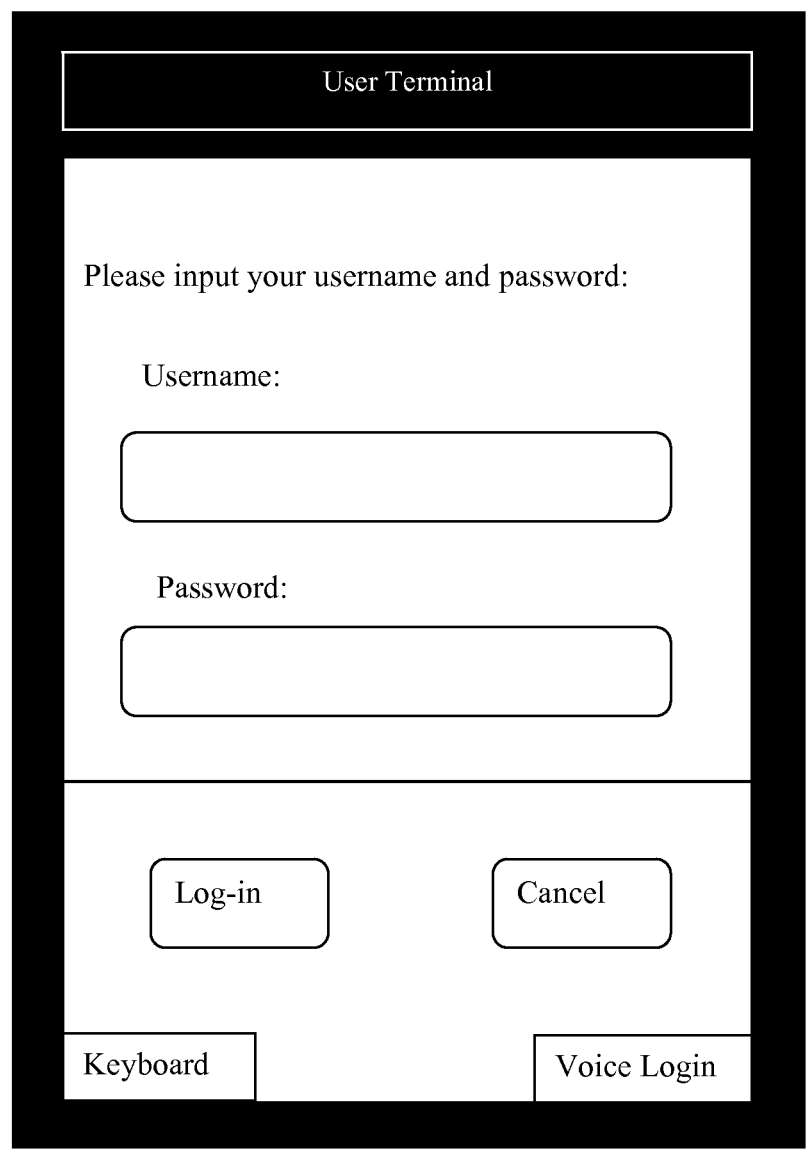
FIGS. 15-18 show examples of user interface display screens displayed on a terminal, according to the exemplary embodiments shown in FIGS. 1A-4.

When a user uses terminal 101 to access a mobile application (app) which has processing performed by session control apparatus 102 of FIG. 1A, the user logs in through a user interface (e.g., as shown in FIG. 15) by inputting user credentials (step S901). These user credentials may include a username and password. For example, the user may press the "keyboard" button on the user interface to display a keyboard to input the username and password. In addition, the user may press the "Voice Login" to alternatively use voice recognition for inputting the user credentials. It should be noted that the user be presented with other alternative options such as fingerprint reading or retina scanning for inputting user credentials. As shown in FIG. 15, these alternatives may be presented to the user simultaneously in order to offer the user different options of providing user credentials.

In a case in which the authentication of the user is successful (step S902, Yes), the session control apparatus 102 causes a session to be registered in association with the user credentials as session control data in the session control database 103 (step S903). Otherwise, i.e. authentication is not successful (step S902, No), the session control apparatus 102 returns an error message to the user terminal (step S904).

The session control apparatus 102 can maintain and store various session control information, such as shown in FIG. 13. For example, the information stored can include the name of the user, the user name, the device identifier of the terminal the user is currently using, session time, and session status (e.g., expired, notify, etc.). In addition, each user may be assigned a different time limit associated with each session. For example, "Bob Green" has a session of 20 minutes, while "Alice Brown" has a session of 30 minutes.

Once a session has expired, the user will have to log in again. By providing a time limit for each session for each user, unwanted security access can be avoided.

Figure 16:
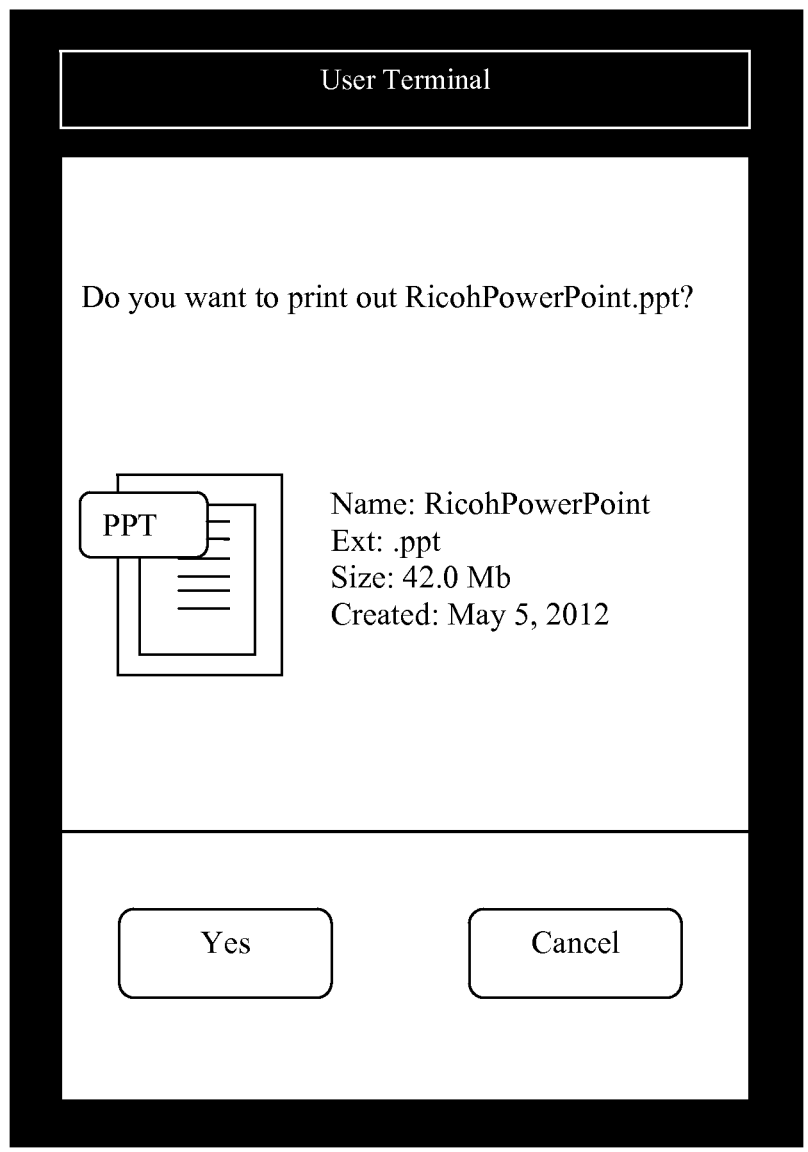

After the user has logged in (e.g., via the user interface display screen shown in FIG. 15) and a session has commenced, the user proceeds to access any of various contents. In example shown in FIG. 16, the user has retrieved the document "RicohPowerPoint.ppt". In the case that the user decides to print out "RicohPowerPoint.ppt", the user presses the "Yes" button on the user interface of the terminal 101, which causes the terminal 101 to send a query to the subnet proxy 105.

Figure 10:
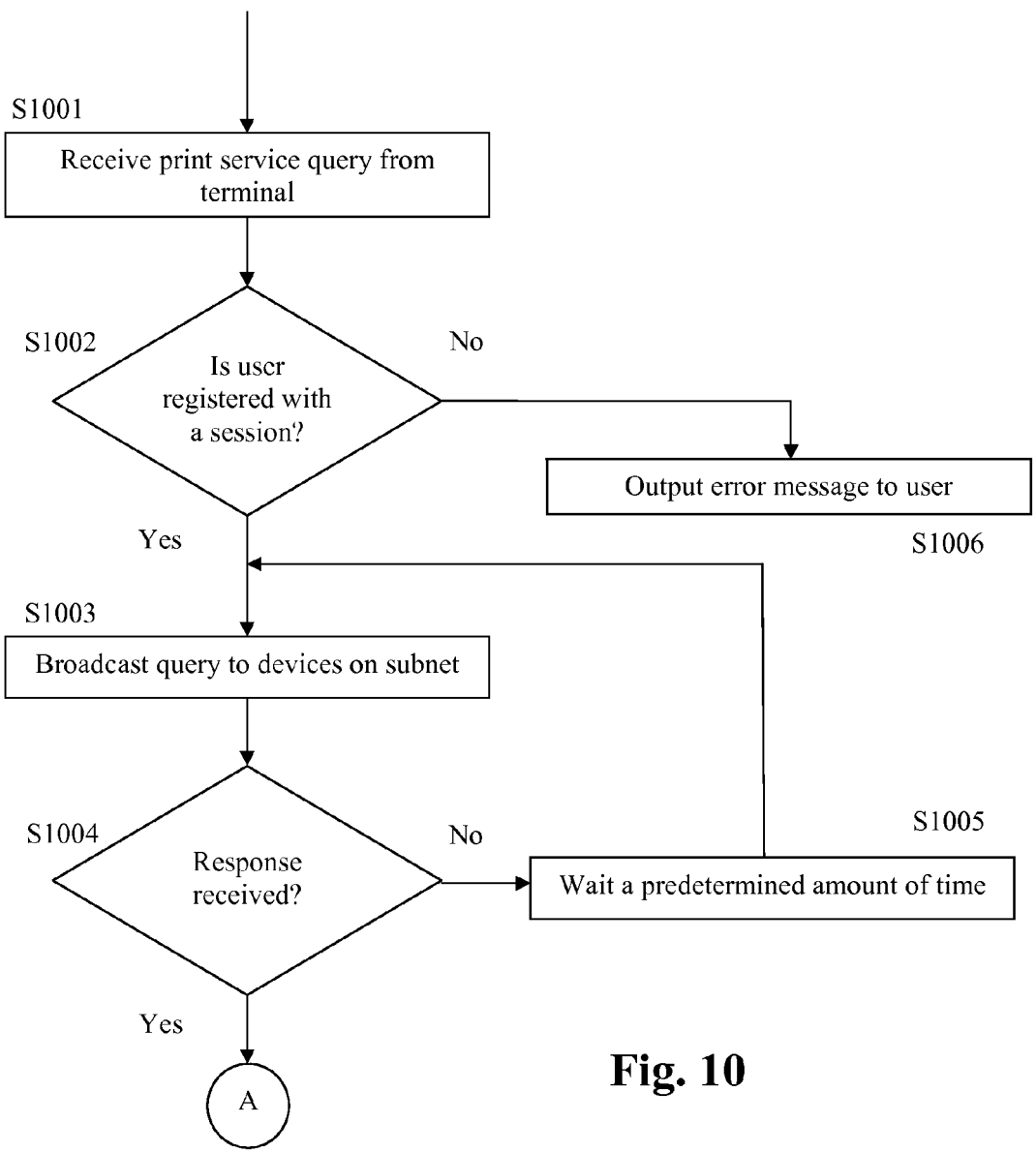
FIGS. 10 and 11 show a flow chart of a method performed by the subnet proxy shown in FIG. 1A, the subnet proxy shown in FIG. 2 and the subnet proxy shown in FIG. 4.
Figure 11:
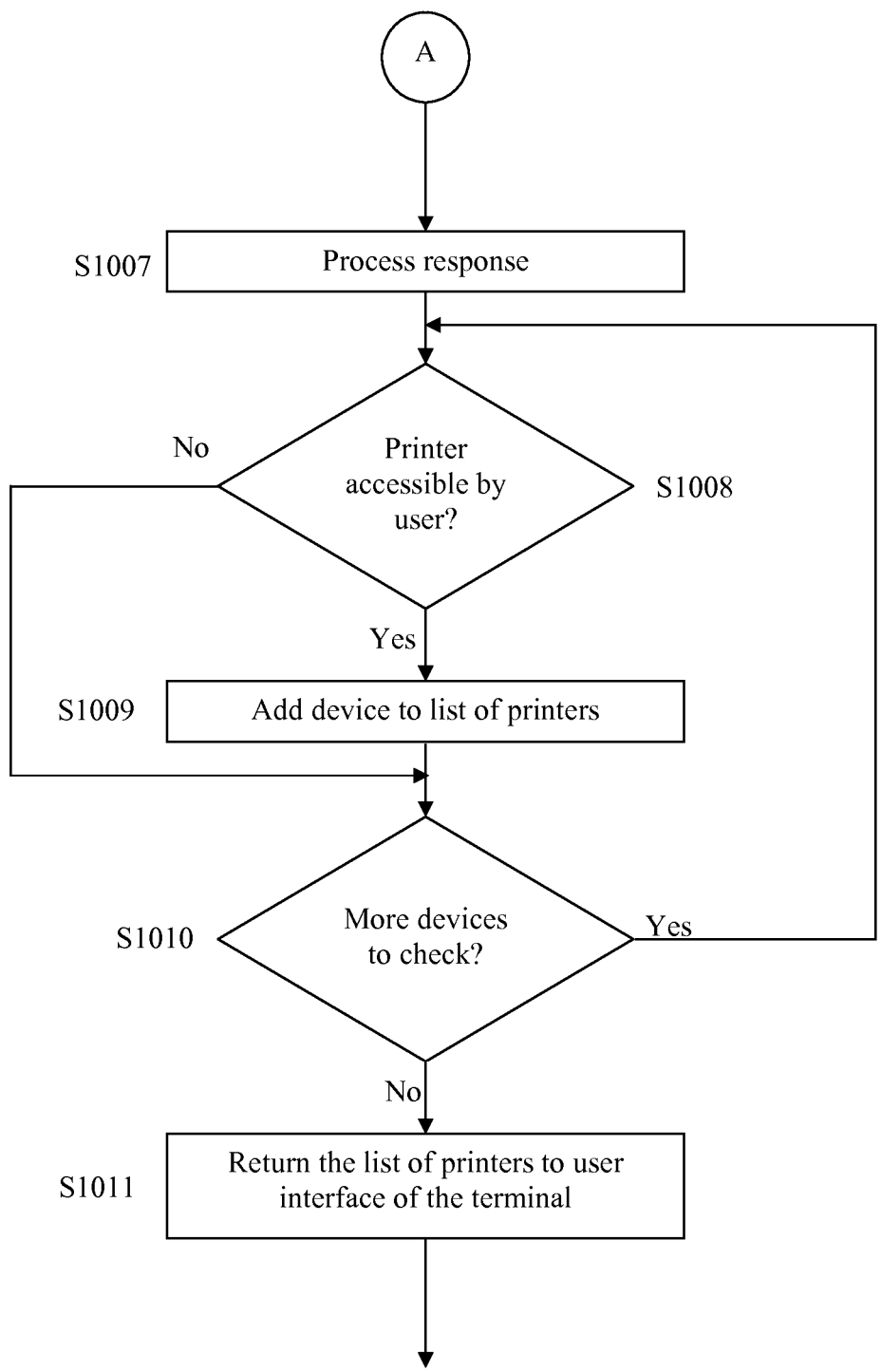

FIGS. 10 and 11 shows a process performed by a subnet proxy (e.g., 105), for advertising printers, according to an exemplary embodiment.

When the subnet proxy receives a print service query from the terminal 101, the subnet proxy determines based on the device identifier (e.g., MAC ID, a device name, etc.) of the terminal 101 whether the user is associated with an active session, such as by referring to the session control information (FIG. 13) maintained by session control apparatus 102. In the case that there is an active session, the subnet proxy broadcasts a query eliciting a response from printers within the subnet to which the terminal is currently connected (step S1003). In the case in which a response has not been received (S1004, No), the subnet proxy waits a predetermined amount of time (e.g., 30 seconds, 1 minutes, 10 minutes, etc.) and broadcasts the query again (step S1005).

In the case in which a response from a printer is received (S1004, Yes), the subnet proxy 105 processes the response (step S1007) and checks whether the responding printer is accessible by the user (step S1008). For example, the subnet proxy can communicate with a device management apparatus (e.g. 211 in FIG. 2) or a directory service, and/or refer to information (e.g., as shown in FIG. 14) indicating functions accessible to the user and maintained by another device, to determine whether the user is authorized to use the responding printer.

In the case that the user is authorized to use the responding printer, the subnet proxy adds information (e.g., device name, network address, model, functions, etc.) identifying the printer to a list of printers available to the user (step S1009). In the case in which the printer is not available by the user, the subnet proxy does not add the printer to the list. Next, the subnet proxy checks whether there is another responding printer (S1010) and processes the remaining responding printers, until there are no more devices left to check and process. After checking all of the responding printers, the subnet proxy returns the list to the terminal 101 (step S1011).

Figure 17:
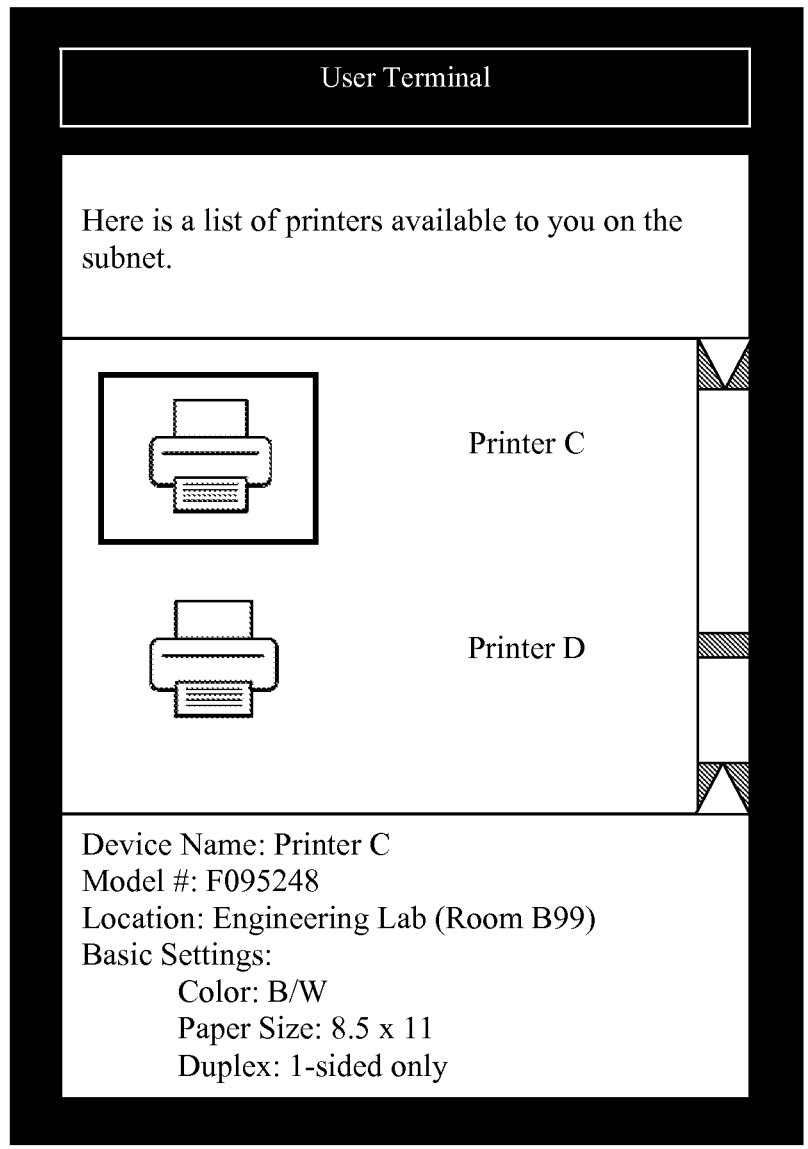

The printers on the list returned to the terminal can be provided as candidate printers to the user through a user interface of the terminal, such as shown in FIG. 17. Although the user may have access to the printing devices currently shown on the list, the user may not have access to all of the functions of each printing device.

FIG. 14 shows a table indicating for each user, the role of the user and functions to which the user has access. For example, user "Michael Scranton" has the role of CEO and thus has access to all functions of each printing device. On the other hand, a user who is a guest can only print in "black & white" and in "duplex".

In an exemplary embodiment, the subnet proxy 105 may also notify users if their session has expired. For example in FIG. 13, the session of "Alice Brown" has expired and thus is no longer active. When this happens, the subnet proxy 105 sends a message to the terminal that "Alice Brown" is currently using to notify her that her session has expired and to reenter her user credentials to start a new session. This message can be in the form of, but not limited to, text, e-mail, app notification, etc. However, the subnet proxy 105 may not always notify the user. For example, "James Jones" may be an incoming guest who will stay for a predetermined amount of time before leaving. For example, this amount of time may be 1 hour and thus the session for "James Jones" is set to be 1 hour as well. When the session has expired, "James Jones" will have already left and thus there is no need to notify him.

In another exemplary embodiment, the subnet proxy 105 may obtain a list of printers from the device management apparatus 211 of FIG. 2. The device management apparatus manages devices that are on a subnet. For example, the device management apparatus 311 may store information similar to the tables in FIGS. 13 and 14. When the subnet proxy broadcasts a query regarding information on devices located on the subnet, the device management apparatus 211 may respond to this query and send to the subnet proxy printers and devices which are currently being managed by the device management apparatus.

Figure 12:
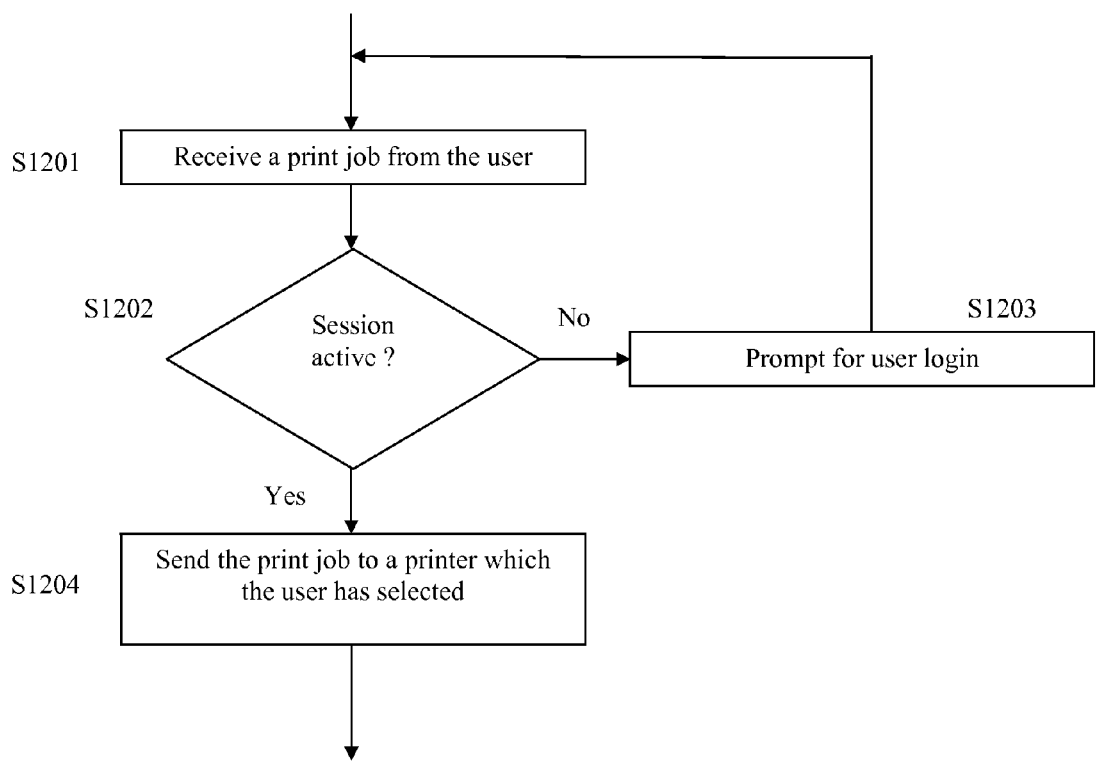
FIG. 12 shows a flow chart of a method performed by the subnet proxy shown in FIG. 1A, the subnet proxy shown in FIG. 2 and the subnet proxy shown in FIG. 4.

FIG. 12 shows another process that may be performed by the subnet proxy, according to an exemplary embodiment. Once the user has access to a list of printing devices, the user may start printing from the terminal 101. In the example that the user has indicated (e.g., in the user interface display screen illustrated in FIG. 16) to print the document "RicohPowerPoint.ppt" and has received a list of printers from the subnet proxy (S1011 in FIG. 11), the user can specify or select one of the printers.

From the list, the user can view the properties of each printer and has the option of selecting one of the printers to print from as illustrated in FIG. 17. For example, the user may want to find a printing device that is nearby. The user determines from the list of printing devices that there is a "Printer C" located in Room B99. The user walks over to Room B99 and locates Printer C. Once the user has located Printer C, the user selects Printer C to specify that the print job should be sent to Printer C.

Figure 18:
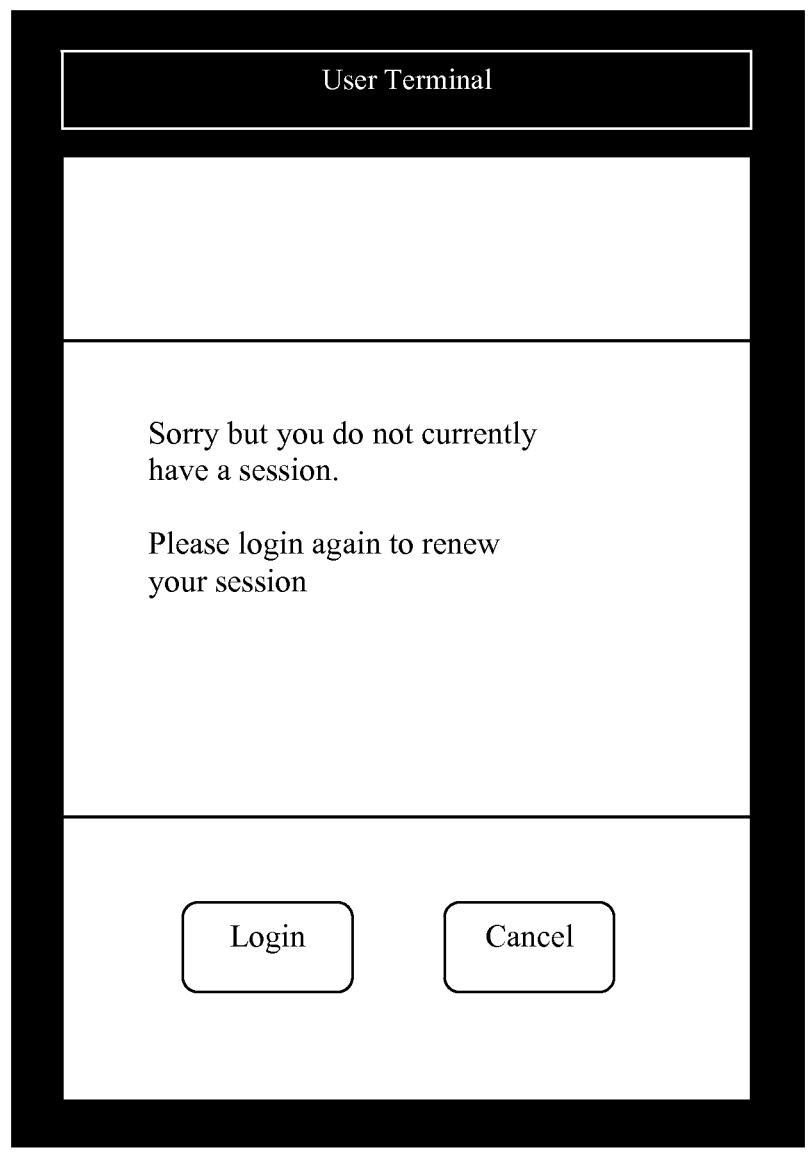

The subnet proxy 105 receives the print job (i.e. print RicohPowerPoint.ppt) from the user (step S1201) and determines whether the user's session is active or not (step S1202). In the case in which the session of the user is active (S1202, Yes), the subnet proxy 105 sends the document "RicohPowerPoint.ppt" to be outputted by Printer C (step S1204). In the case in which the session of the user has expired (S1202, no), the subnet proxy notifies the user that the session expired (e.g., in the user interface display screen illustrated in FIG. 18) and prompts the user to log in (step S1203).

Figure 25:
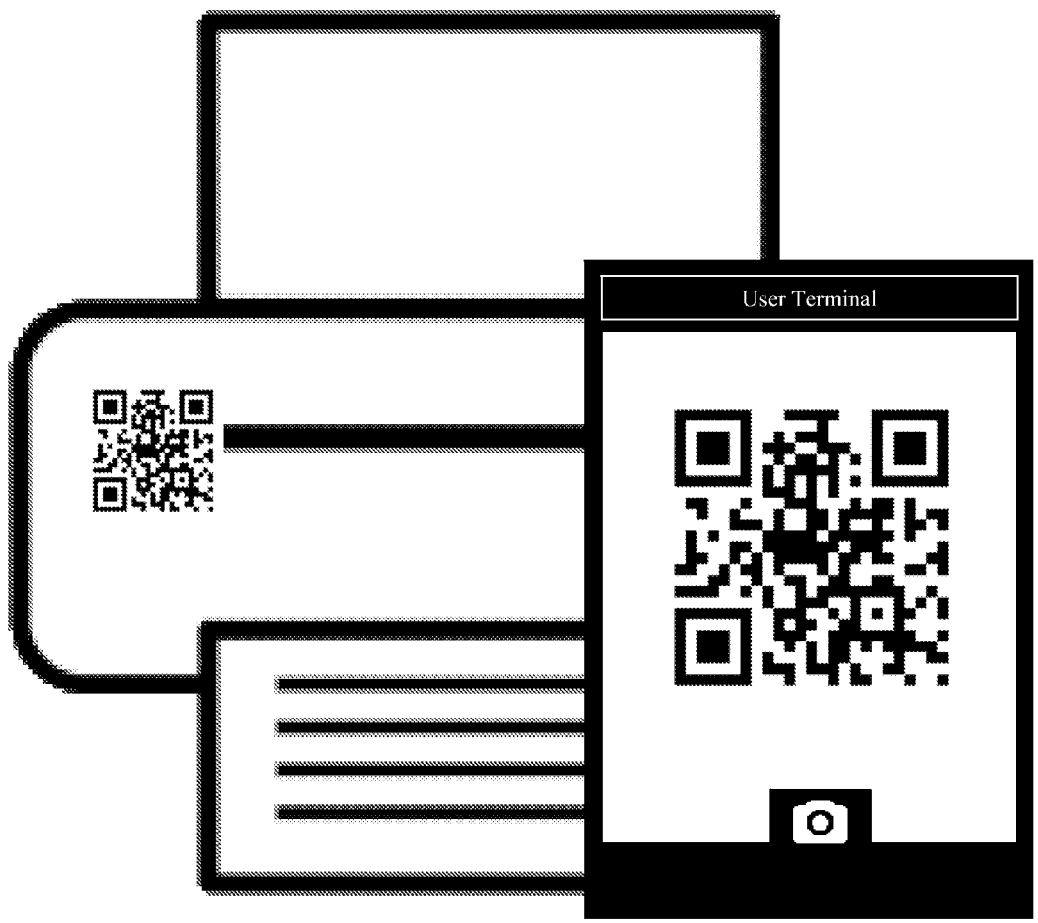
FIG. 25 shows a terminal capturing an image of a barcode on a printing device, according to an exemplary embodiment.

In another exemplary embodiment, the user wants to send a print job (e.g., the document "RicohPowerPoint.ppt") to a printer at which the user has arrived without already having requested print service, or without having selected a printer from a list returned by the subnet proxy. In such example, the user may be standing in front of MFP 107 and can scan a barcode disposed on or near a main body of the MFP 107. For example, when the user uses the terminal, having a barcode scanning function, to scan the barcode (e.g., as shown in FIG. 25), the user effectively selects the MFP as a destination printer, and the document RicohPowerPoint.ppt is sent to the MFP 107. In FIG. 25, the barcode on or near the MFP 107 indicates an identifier of the MFP 107. When the terminal scans the barcode, the identifier is sent to the subnet proxy 105 to cause the subnet proxy 105 to send the document "RicohPowerPoint.ppt" to the "Printer C". Then, the user can enter job release information at the MFP 107 to obtain an output of the print job at the MFP 107.

Figure 19:
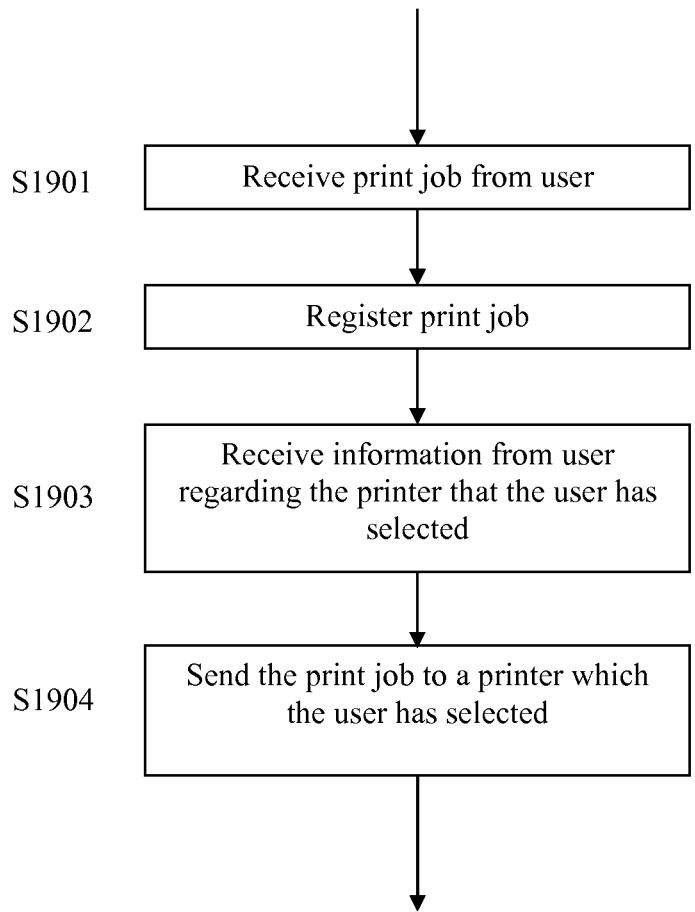
FIG. 19 shows a flow chart of a method for providing print services, according to an exemplary embodiment.
Figure 21:
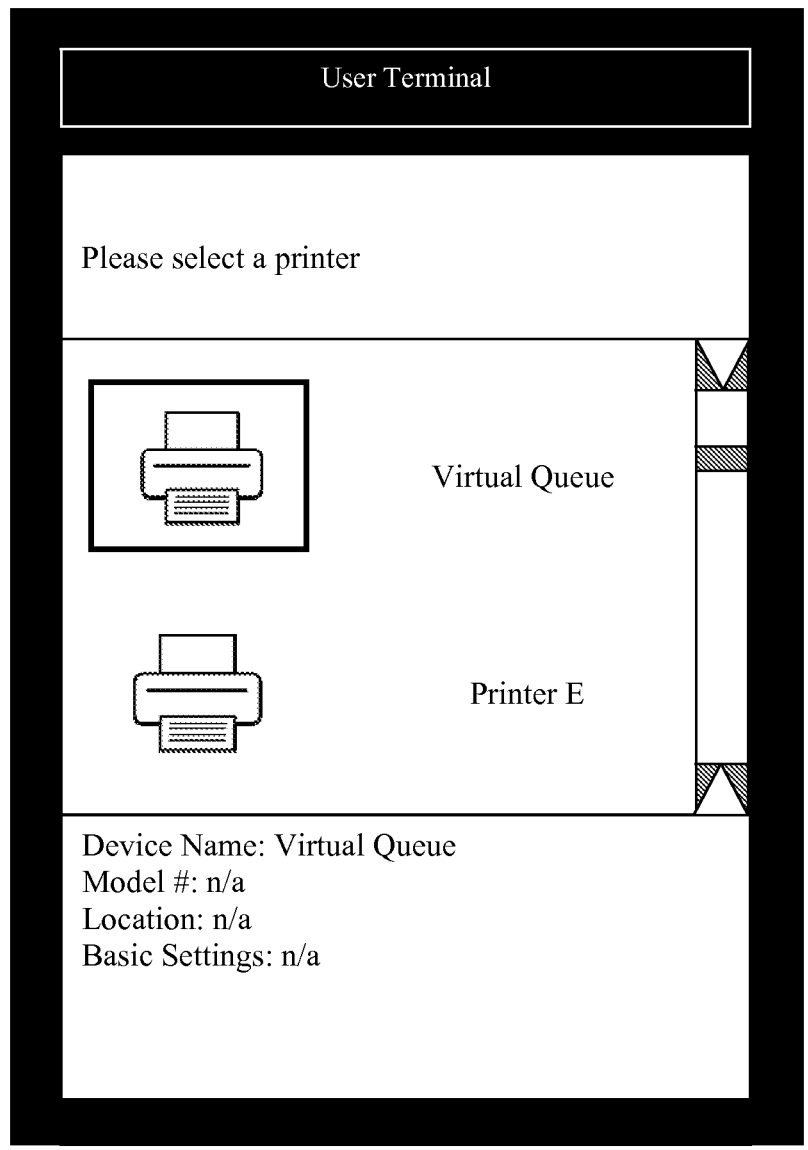
FIGS. 21-23 show examples of user interface display screens displayed on a terminal, according to the exemplary embodiments shown in FIGS. 1A-4.

FIG. 19 shows a process performed by the job processing apparatus 311, according to an exemplary embodiment. In many instances, when the user submits a print job in a mobile context, the user has not yet identified a printer that can generate a print output of the print job, for various reason (such as if no printer is within line of sight, a printer within line of sight does not have the desired capabilities or functions, etc.). In such context, the user may submit the print job to a generic job destination ("Virtual Queue" indicated in FIG. 21) which is not associated with any particular printing device and instead is processed by the job processing apparatus 311.

Figure 22:
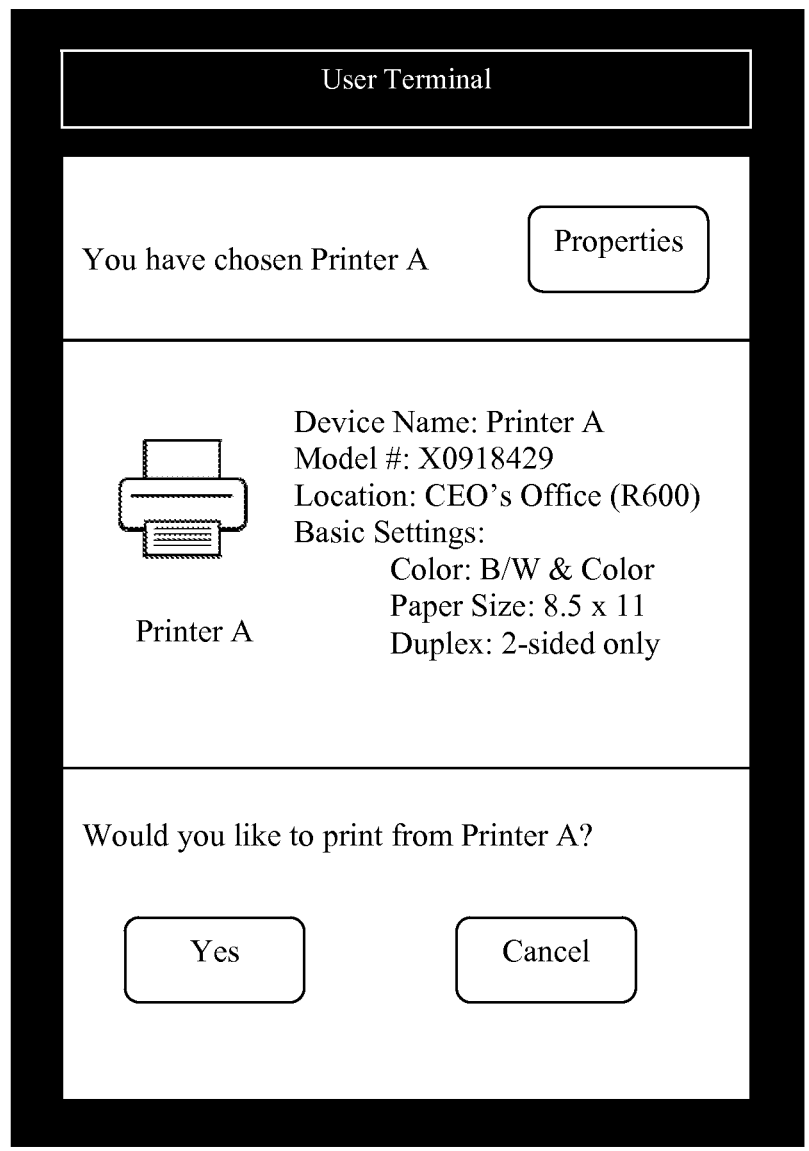

When the user selects the virtual queue to which to submit a print job, the print job is instead sent to the job processing apparatus 311 where it is stored in the job repository 312 as one of the registered print jobs (shown notionally in FIG. 24) to be processed. For example, the job processing apparatus 311 receives the document "RicohPowerPoint.ppt" which was sent by the user (step S1901) and stores the print job in the job repository 312 (step S1902). At a later point in time, when the user is ready to obtain a print output, the user can select a printer from a list displayed by the user interface of the terminal or by scanning a barcode at such printer (S1903). Once the user has selected the printer, the user is presented with information regarding the selected printer. In the example shown in FIG. 22, the user has chosen Printer A and information (such as device name, model number, physical location, etc.) regarding "Printer A" is presented to the user through the user interface of terminal 101. The user may also be presented with information regarding the current settings (such as color, paper size, etc.) of the printer, when the user presses the Properties button to change the properties of Printer A.

When the user presses "Yes" button, the job processing apparatus 311 sends the document "RicohPowerPoint.ppt" to Printer A to be outputted (step S1904).

Figure 20:
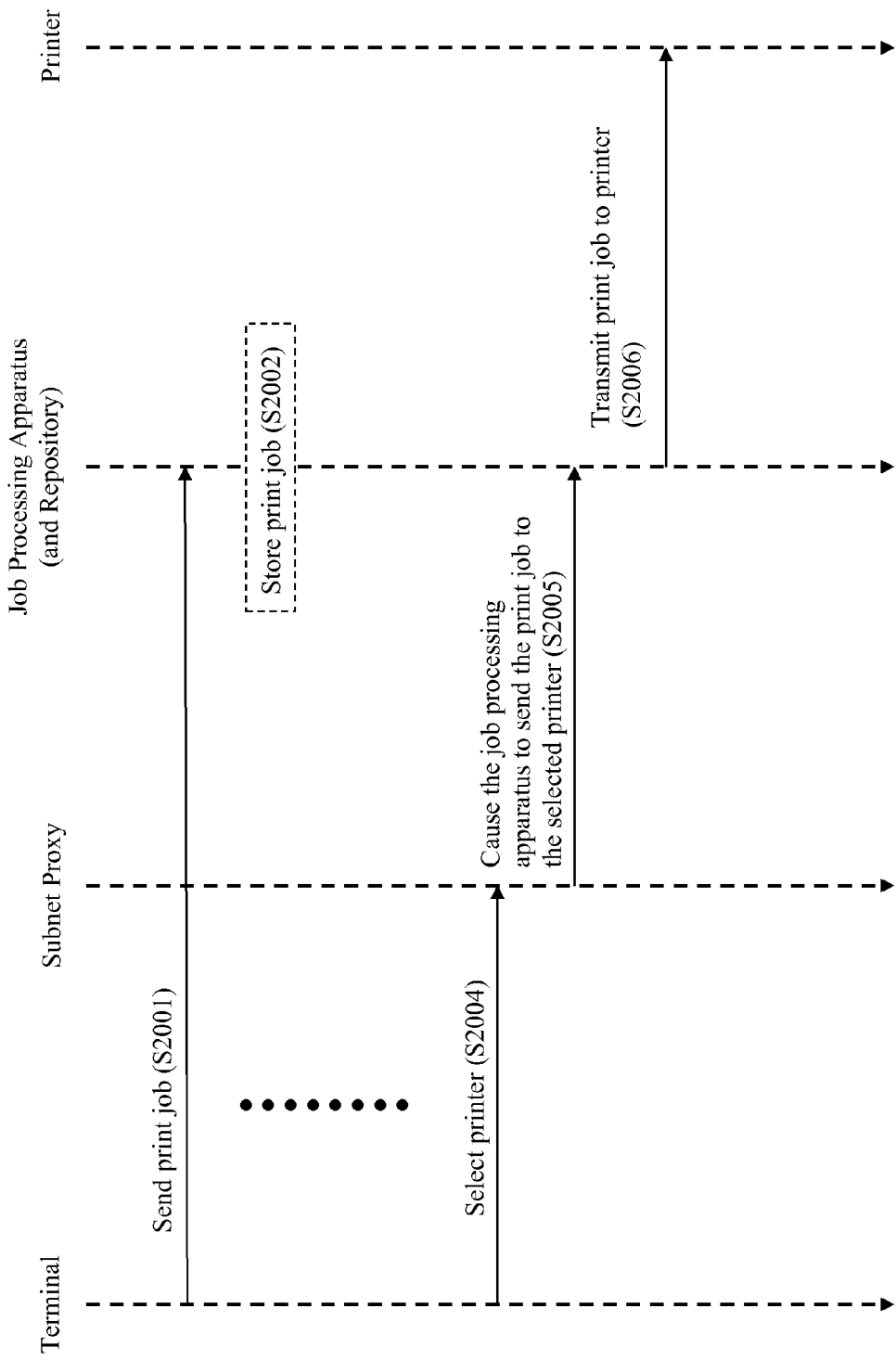
FIG. 20 shows a schematic diagram of an example of communication flow in the system shown in FIG. 3A and in the system shown in FIG. 3B.

FIG. 20 shows a process performed in, for example, the system 300A (illustrated in FIG. 3A), according to an exemplary embodiment.

When a user wants to print a document from a terminal, the user selects a generic printing destination and the terminal sends the print job to that destination (step S2001). In this case, the generic printing destination is a job processing apparatus. While the user is performing other unrelated print tasks after submitting the print job, the job processing apparatus receives the print job and stores the print job in a repository until the user requests to output the print job to a printer (step S2002. Once the user has finished performing the other unrelated print tasks, the user selects a printer and the terminal sends the selected printer information to the subnet proxy (step S2004). The subnet proxy, then, communicates with and causes the job processing apparatus to retrieve the print job from the repository (step S2005) and send the print job to the printer previously selected by the user (step S2006). However, if the job processing apparatus does not receive any information regarding which printer the user has selected, the job processing apparatus stores the print job until it receives the information.

A typical workflow in the system includes (a) submitting user credentials from the terminal 101, via the network 104 to an access control apparatus (e.g., 102 in FIG. 1A, 102C in FIG. 1C, etc.), to cause the access control apparatus to register an access control session in association with the authenticated user credentials and a device identifier of the terminal, (b) submitting a print job from the terminal to a generic job destination (discussed infra) not associated with any particular printing device, to cause the print job to be registered in association with the user credentials in a job repository associated with the generic job destination, (c) transmitting a print service query from the terminal 101, which is connected to a particular subnet, to cause the subnet proxy to (i) determine based on the device identifier of the terminal, whether an active session is registered in association with the terminal and (ii) in a case that the subnet proxy apparatus determines that an active session is registered in association with the terminal, determine based on the user credentials registered in association with the terminal in the active session one or more printers available to the terminal on the subnet and return a list identifying the one or more printers available to the terminal, and (d) specifying, from the terminal, a particular printer amongst the one or more printers available to the terminal, to cause the print job stored in association with the user credentials in the job repository to be transmitted to the particular printer.

In an exemplary embodiment, the user may submit multiple print jobs to the job processing apparatus 311. The user may access a table listing the different print jobs submitted by the user and the statuses of each of the print jobs through the web service hosted by the job processing apparatus 311 or the app on the terminal 101 which has processing performed by the job processing apparatus 311. In the example shown in FIG. 26, the table contains the name of the print job, the no. of pages in the print job and the status of each print job (ready, printing, uploading, etc.). The user has the option of removing print jobs and modifying the properties (paper size, color, grayscale, black & white, output pages, etc.) of each of the print jobs. However as indicated by shaded checkboxes, the user cannot remove or modify a particular print job while the particular print job is currently being uploaded or printing. It should also be noted that the user has the option of printing multiple documents simultaneously.

Figure 23:
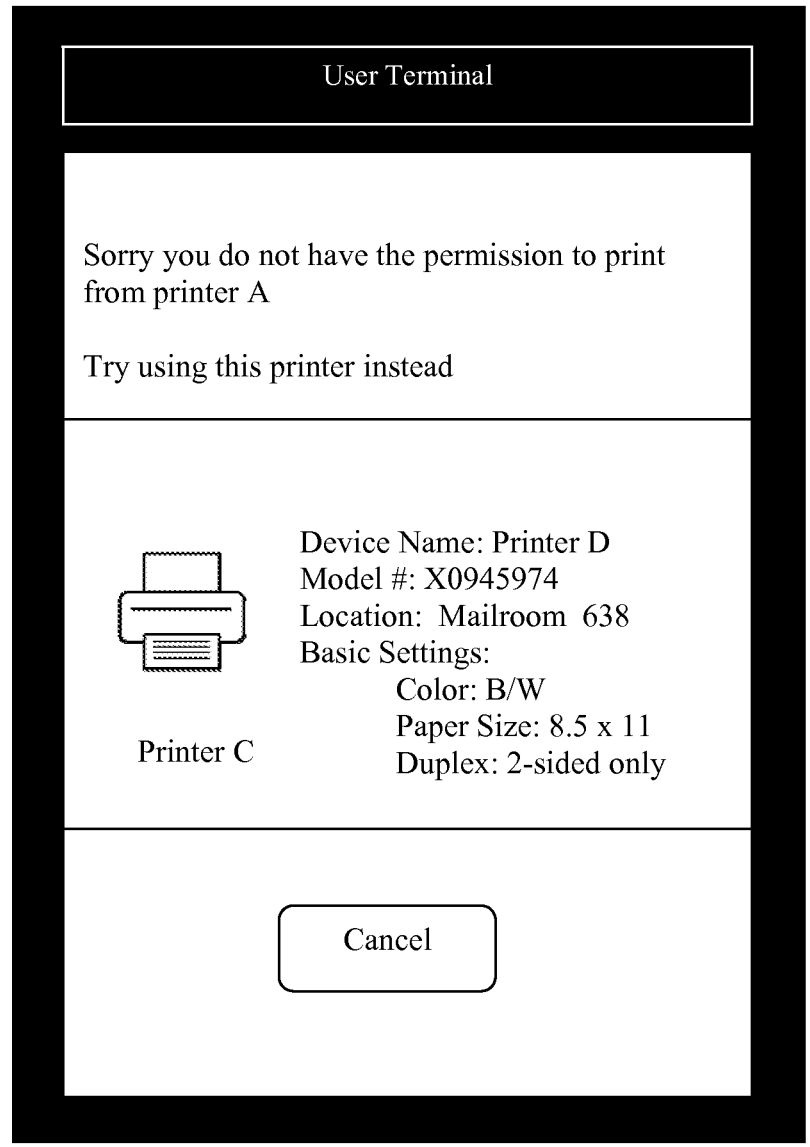

In an exemplary embodiment, the user may not be able to access a particular printing device which was selected by the user. This may be because the user does not have the access rights to print from that particular printing device. As shown in FIG. 23, the user has tried to print out the document "RicohPowerPoint.ppt" from the "Printer A". However, the user is presented with a message explaining that the user does not have permission to print from "Printer A". Instead, the user is given the option of printing from another printing device. In this case, the user is recommended to print from a "Printer D" instead. Thus, if the user is unable to access a selected printing device, the user may be presented with alternative printing devices instead. On the other hand, if there are no alternative printing devices located on the same subnet, the user is presented with a message indicating so.

Figure 27:
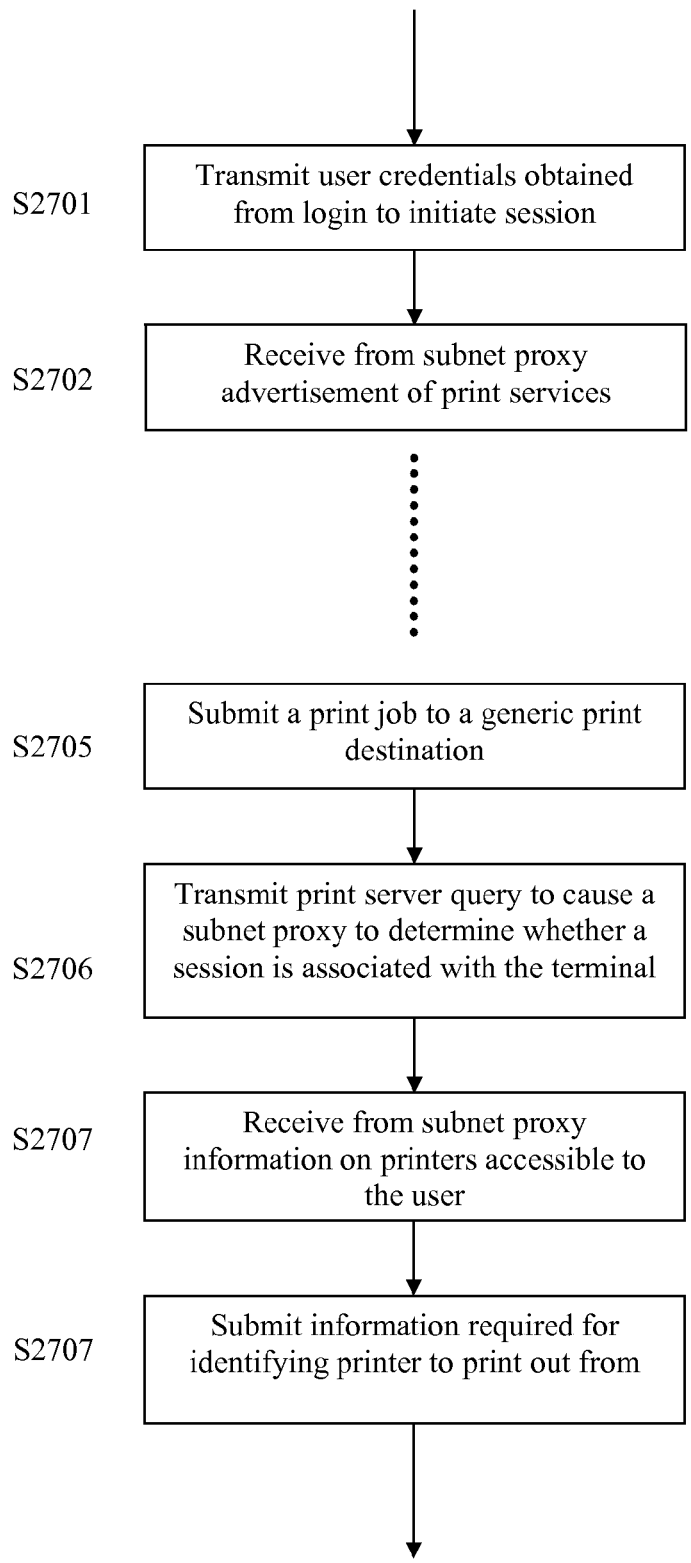
FIG. 27 shows a flow chart of a method for providing print services, according to an exemplary embodiment.

Turning now to FIG. 27, there is shown a flowchart of a method performed by an access control application, such as illustrated in FIG. 1C, according to an exemplary embodiment.

When a user accesses a mobile application (app) using a terminal or alternatively a web service, the access control application, through the terminal, transmits user credentials to an access control apparatus (S2701) to start a session. While, the user is performing unrelated printing tasks, the access control application receives from a subnet proxy, advertisement of print services (S2702). When a user is ready to print, the access control application sends a print job that the user has chosen to a generic printing destination which is then stored in a job repository (S2705). Next, the access control application sends a print query to a subnet proxy to cause the subnet proxy to determine whether the user is associated with a session (step S2706). In a case in which the user is associated with a session, the access control application receives a list of printers accessible to the user from a subnet proxy (S2707). To release the print job held in the job repository, the user sends information designating a printer in order for the print job to be outputted from that printer (2708).

In an exemplary embodiment, the advertising of the print service by the subnet proxy and the print service query sent may be transparent to the user.

The orders in which the steps are performed in the aforementioned methods are not limited to those shown in the examples of FIGS. 9-12, 19, 20 and 27, and may be switched as long as similar results are achieved. Also, it should be noted that the methods illustrated in the examples of FIGS. 9-12, 19, 20 and 27 may be implemented using any of the systems described in connection with FIGS. 1-4.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

In another example, each subnet that might contain mobile devices that require printing services contains a subnet proxy (which as discussed herein, may be a physical appliance and/or a software implementation on a computer) that advertises printing services. Further, a central database allows mobile users to authenticate using either a web page or an app running on the mobile device. Authentication can be performed with reference to a directory service (e.g., LDAP or Active Directory server) for internal users, and guest users can authenticate by using a guest access code. Once authenticated, the user's credentials will be associated with the mobile device (e.g., MAC address) until the login session expires. When a zero configuration approach (such as using the Bonjour protocol) is employed, the location of the authentication server can also be advertised, removing the need to configure or know the address of this server. Although the examples discussed supra associate a user with a printer, it should be appreciated that groups of users (e.g., LDAP or AD groups) may be associated with groups of output devices (e.g., by a device management server, to authorize the use of those devices by that group of users.

In addition, when a user attempts to print from a mobile device and the mobile device attempts to discover printers (i.e. request print services) on the network, the subnet proxy checks the device's identifier against current sessions on the session control or access control apparatus. If there is no session associated with the device identifier, no devices are advertised by the subnet proxy. Any print job from a device identifier that does not have a valid session is rejected. If the device identifier previously had a valid session, a notification (email, message, etc) may be sent to the user associated with that previous session. If there is an active session, the subnet proxy determines the devices the user is authorized to use, and responds with that list. The proxy server can automatically advertise the output device capabilities (such as PDL, color, duplexing, etc) based on the data available from the device management system, eliminating the need to manually enter the information, or to query it dynamically (generating additional network traffic).

Once the user begins to print, the subnet proxy forwards the stream of print data to the actual output device, which may reside on a different subnet on the network. The subnet proxy may also record printer usage information by device identifier and user ID.

Additionally, the systems and methods discussed herein can employ a pull printing capability. By defining one or more virtual print queues and then allowing access to those queues using the access control mechanism (as described above), users can print to a secure print queue where the jobs will be held until released at an output device, or the job expires and is automatically deleted after a predefined length of time. To release a pull print job, a user can use conventional authentication (e.g., LDAP or AD authentication, PIN code or an access card, such as swipe card, smart card, proximity card, etc., associated with user credentials), to authenticate at the output device and release the job for printing at that device.

Further, the user can use an app on the mobile device to read a barcode (e.g., QR code) applied to the output device, aiming the camera of the mobile device at the QR code. The app on the mobile device can read a QR code (or similar barcode etc), extract an identifier from the QR code, and then match that to a specific output device. The mobile app can then inform the subnet proxy, authentication server or another appropriate server and request the release of print jobs associated with the mobile device's MAC address and the output device's virtual print queue. The QR code-based print release mechanism could be utilized also with standard pull printing systems where print jobs are conventionally submitted from desktops, laptops and other workstations. By associating credentials with the mobile device (e.g., in address-based sessions described herein, or by user credentials entered on the app on the mobile device), a user could release the waiting print jobs at any output device without the need for an embedded application or hardware device at the output device.

What is claimed is:

1. An access control method for print services provided over a network including one or more subnets, said access control method comprising:
   (a) submitting user credentials, entered through an access control application or browser application on a terminal, via the network to an access control apparatus, to cause the access control apparatus to authenticate the user credentials and register an access control session in association with the authenticated user credentials and a device identifier of the terminal;
   (b) receiving, from a subnet proxy apparatus, advertisement of print services;
   (c) submitting a user-specified print job from the terminal to a generic job destination not associated with any particular printing device, to cause the print job to be stored in association with the user credentials in a job repository associated with the generic job destination;
   (d) transmitting a print service query from the terminal, which is connected to a particular subnet, to cause the subnet proxy apparatus to (i) determine based on the device identifier of the terminal, whether an active session is registered in association with the terminal and (ii) in a case that the subnet proxy apparatus determines that an active session is registered in association with the terminal, determine based on the user credentials registered in association with the terminal in the active session one or more printers available to the terminal on the subnet and return a list identifying the one or more printers available to the terminal; and
   (e) specifying, from the terminal, a particular printer amongst the one or more printers available to the terminal, to cause the print job stored in association with the user credentials in the job repository to be transmitted to the particular printer.

2. The access control method of claim 1, further comprising:
   entering required job release information at the particular printer to cause the printer to generate an output based on the print job,
   wherein the printer to which the print job is transmitted through the network holds the print job and does not generate an output until the required job release information is entered at the printer.

3. The access control method of claim 1,
   wherein the print job is submitted via the access control application on the terminal.

4. The access control method of claim 1, further comprising:
   reading through the access control application on the terminal a printer identifier on the particular printer, and then outputting the printer identifier to specify the particular printer in (d).

5. The access control application including one or more programs of computer-executable instructions embodied in a non-transitory computer-readable medium and executable by a processing unit of the terminal, to perform the method of claim 1.

6. The access control application of claim 5, wherein
   the access control application provides a user interface for entry of the user credentials.

7. The access control application of claim 5, wherein both of (i) the advertisement by the subnet proxy apparatus of print services and (ii) the print service query transmitted from the terminal are transparent to the user.

8. The access control application of claim 5, wherein
   the access control application provides a user interface for the user to specify the print job to be submitted.

* * * * *